US009009858B2

(12) United States Patent
Sapp, II et al.

(10) Patent No.: US 9,009,858 B2
(45) Date of Patent: Apr. 14, 2015

(54) SYSTEMS AND METHODS FOR PROVIDING AND MANAGING DISTRIBUTED ENCLAVES

(71) Applicant: Okta, Inc., San Francisco, CA (US)

(72) Inventors: Kevin Eugene Sapp, II, Washington, DC (US); Victor Ronin, Reston, VA (US)

(73) Assignee: Okta, Inc., San Francisco, CA (US)

( * ) Notice: Subject to any disclaimer, the term of this patent is extended or adjusted under 35 U.S.C. 154(b) by 36 days.

(21) Appl. No.: 13/830,900

(22) Filed: Mar. 14, 2013

(65) Prior Publication Data
US 2013/0312117 A1 Nov. 21, 2013

Related U.S. Application Data

(60) Provisional application No. 61/648,047, filed on May 16, 2012, provisional application No. 61/666,510, filed on Jun. 29, 2012.

(51) Int. Cl.
G06F 1/26 (2006.01)
G06F 21/62 (2013.01)

(52) U.S. Cl.
CPC ..................................... G06F 21/62 (2013.01)

(58) Field of Classification Search
CPC ...... H04L 63/04; H04L 63/20; H04L 63/0218
USPC ................ 726/4, 26, 30; 713/150, 171; 705/1
See application file for complete search history.

(56) References Cited

U.S. PATENT DOCUMENTS

| 6,519,568 | B1 * | 2/2003 | Harvey et al. .................. 705/1.1 |
| 7,073,199 | B1 | 7/2006 | Raley |
| 7,236,597 | B2 * | 6/2007 | Elliott et al. .................. 380/263 |
| 7,469,239 | B2 | 12/2008 | Musman |
| 7,734,844 | B2 * | 6/2010 | Pedersen et al. ................. 710/36 |
| 7,987,471 | B2 | 7/2011 | Herzog et al. |
| 8,037,530 | B1 * | 10/2011 | Fink et al. ........................ 726/23 |
| 8,170,536 | B2 | 5/2012 | Normark et al. |
| 8,185,090 | B2 | 5/2012 | Normark et al. |
| 8,380,981 | B2 * | 2/2013 | Beckwith et al. ............. 713/156 |
| 8,640,189 | B1 * | 1/2014 | Ernst et al. ........................ 726/1 |

(Continued)

OTHER PUBLICATIONS

Haberman B, Connecting Enclaves across the global information grid layer-3 utilizing VPN protocols, Oct. 2005, IEEE, vol. 3, pp. 1838-1843.*

(Continued)

Primary Examiner — Dede Zecher
Assistant Examiner — Viral Lakhia
(74) Attorney, Agent, or Firm — Fenwick & West LLP

(57) ABSTRACT

A method for operating a distributed data management and control enclave comprises providing a policy that identifies a set of data to be managed and controlled. The policy further identifies devices upon which the data may be transferred and the conditions under which that data may be transferred to the identified devices. A first data management and control system to be used on a first device is then defined in the policy. A second management and control system to be used on a second device is then defined in the policy. The second data management and control system can be distinct from the first data management and control system. The specified data management and control system is then instantiated on a device. The specified data management and control system is then used to manage and control data on the device in accordance with the policy.

20 Claims, 10 Drawing Sheets

(56) References Cited

U.S. PATENT DOCUMENTS

| | | |
|---|---|---|
| 2008/0244049 A1 | 10/2008 | Normark et al. |
| 2009/0094674 A1* | 4/2009 | Schwartz et al. .................. 726/1 |
| 2010/0318799 A1* | 12/2010 | Simon et al. .................. 713/171 |
| 2010/0318800 A1* | 12/2010 | Simon et al. .................. 713/171 |
| 2011/0296164 A1* | 12/2011 | Boebert et al. ................ 713/150 |
| 2012/0084838 A1* | 4/2012 | Inforzato et al. .................. 726/4 |
| 2013/0031262 A1 | 1/2013 | Yu et al. |
| 2013/0152206 A1* | 6/2013 | Staubly ........................... 726/26 |
| 2013/0312117 A1* | 11/2013 | Sapp et al. ....................... 726/30 |

OTHER PUBLICATIONS

International search report and written opinion dated Jun. 28, 2013 for PCT/US2013/031474.

\* cited by examiner

SYSTEMS AND METHODS FOR PROVIDING AND MANAGING DISTRIBUTED ENCLAVES

CROSS-REFERENCE

This application claims priority to U.S. Provisional Patent Application No. 61/648,047, filed May 16, 2012, and U.S. Provisional Patent Application No. 61/666,510, filed Jun. 29, 2012, each of which is entirely incorporated herein by reference.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2012, SpydrSafe Mobile Security, Inc.

BACKGROUND

Maintaining control over application data is a long-standing problem for which certain solutions have been developed. Unfortunately, these solutions have not been widely adopted because they do not address fundamental technical and/or market requirements in acceptable ways. Some systems have relied upon operating-system based access controls in order to protect the information; these types of systems may be incapable of effectively operating in a distributed, semi-connected operating environment, and may be further limited in their ability to provide a set of common enforcement controls if operating on disparate computer systems. To circumvent these limitations, some systems have focused on the persistent protection of the data itself (e.g., digital rights management). Some of these techniques focus on protecting data using encryption and enforcing controls by managing access to the decryption keys required to access the data. Digital rights management (DRM) type systems have well-known problems and limitations surrounding key management, use of the data for non-DRM enabled applications (e.g., requiring application modification), and of data leakage (either intentional or unintentional) once the data is decrypted and made available to the application.

Some known systems have implemented data controls by restricting the movement of the data inter- and intra-device using physical or logical limitations upon data movement. These approaches may be implemented using a variety of techniques, such as discretionary and mandatory access controls. Access control techniques may operate at the file level (and not the record level, which may limit their usefulness to manage collections of data records), may be limited to restricting classes of access to the information (initial access, read, write, delete), and may require a common trusted control infrastructure so the control definitions are distributed and enforced consistently between devices. These limitations may restrict the type and granularity of protection, may require deployment architectures where there are trusts established between devices, and may not protect against information leakage at the application level. Refinements of these systems, such as compartmented multi-user workstations, extend these techniques for additional granularity, but suffer the same limitations in managing the control of information between systems.

Other systems may require control aware applications. Control aware applications include techniques that wrap applications, or provide a library which application writers may use. These systems may not be able to use unmodified applications and enforce data controls on either an intra- and inter-device basis. Other approaches for implementing more granular data control may include tainting-based techniques, which may associate one or more tags with specific data, tracks these tags with the data wherever the data is moved within the device, and inhibit or permit actions based upon the tags present with a specific piece of data. Tainting-based approaches may be limited to the boundaries of a single device.

SUMMARY

Recognized herein are various limitations associated with data applications currently available. Some techniques currently available may be implemented in the controlling software of the device (e.g., in the operating system, hypervisor, or JVM), and define how a device protects the data that is used upon it. Such data applications may not define how data should be controlled intra-device and when data protection methods are available, nor do they define inter-device controls and protections. Absent trust relationships, none of the approaches currently available are able to interconnect with a remote device in order to exchange information, determine the data protections provided by the remote device, and then determine and communicate data between the devices.

Recognized herein is the need for systems that are capable of defining, for a specific set of data, the plurality of devices the information should be controlled upon, methods for controlling data to be used for each device (which may differ from device to device), and the limits upon how the information may move inter- and intra-device, and then enforcing these definitions.

In an aspect of the present disclosure, a device comprises a plurality of local enclave instance (LEI) engines adapted to provide management and control of data on the device, and a local controller in communication with a policy source. The local controller is programmed to select a given LEI engine from the LEI engines in accordance with one or more LEI specifications provided by a policy obtained from the policy source. The device comprises a processor that is programmed to instantiate the given LEI engine on the device, and the given LEI engine, upon instantiation, provides management and control over one or more data on the device in accordance with the management and control specifications of the policy. In an embodiment, the given LEI provides management and control of data on the device in accordance with management and control specification provided by an enclave having the LEI. The enclave may be hosted by a system coupled to the device.

In another aspect, a method for operating a distributed data management and control enclave comprises providing a policy for the identification of data to be managed. The policy identifies (i) one or more devices to which the data may be transferred and (ii) the conditions under which the data may be transferred to the one or more devices. A first data management and control system to be used on a first device is defined with the aid of a processor. A second management and control system to be used on a second device is defined with the aid of a processor. The second data management and control system is distinct from the first data management and control system. The first data management and control system is then instantiated on the first device. Data on the first device and/or second device is managed in accordance with the policy. In an embodiment, the method further comprises instantiating the second data management and control system on the second device. In another embodiment, the method further comprises managing data on the second device in accordance with the policy. In another embodiment, the method further comprises transferring data from the first device to the second device, or vice versa. In another embodiment, the first data management and control system is defined in the policy. In another embodiment, the second data management and control system is defined in the policy. In another embodiment, the method further comprises using the first data management and control system to manage and control data movement from the first device to the second device, or vice versa, in accordance with the policy.

In another aspect, a method for operating a cooperative device to manage and control data comprises identifying controlled data using a first local enclave instance (LEI) on a first device. The first LEI includes one or more policies regulating usage and/or access rights to the controlled data. A request is received to transfer the controlled data from the first LEI to a destination residing in (i) an application external to the first LEI and on the first device, (ii) a second LEI, or (iii) a second device. One or more attributes of the destination are then determined with the aid of a processor. The request is the permitted or denied based upon a processor-assisted comparison of the one or more attributes against one or more attributes for permitting data transfer provided in the one or more policies. In an embodiment, the second LEI is on the second device. In another embodiment, the second LEI includes one or more policies for regulating usage and/or access rights that are different from the one or more policies of the first LEI.

In another aspect, a method for enabling a user to manage and control data comprises identifying controlled data using a first local enclave instance (LEI) on a first device. The first LEI includes one or more policies regulating usage and/or access rights to the controlled data. Next, with the aid of a processor, a destination location is identified which resides in (i) an application external to the first LEI and on the first device, (ii) a second LEI, and/or (iii) a second device. One or more attributes of the location are then determined. Next, with the aid of a processor, the one or more attributes are compared against one or more attributes for permitting data transfer provided in a policy. Transfer of the controlled data to the destination location is permitted based upon the comparison. In an embodiment, the second LEI is on the second device. In another embodiment, the second LEI includes one or more policies for regulating usage and/or access rights that are different from the one or more policies of the first LEI.

In another aspect, a method for enabling a user to use and/or access data comprises identifying controlled data on an electronic device of the user. Next, with the aid of a processor, a first set of attributes of the electronic device and/or storage location of the electronic device having the controlled data are determined. Next, the first set of attributes is compared against a second set of attributes for permitting usage of and/or access to the controlled data. The second set of attributes is provided in a policy of an enclave. The user is permitted to use and/or access the controlled data based upon the comparison. In an embodiment, the controlled data resides in a local enclave instance (LEI) of the enclave. In another embodiment, the first set of attributes comprises one or more attributes. In another embodiment, the second set of attributes comprises one or more attributes. In another embodiment, the enclave resides in a data management and control system coupled to the device.

Another aspect provides a computer readable medium comprising code that, upon execution by one or more computer processors, implements a method comprising (a) providing a policy for the identification of data to be managed. The policy identifies (i) one or more devices to which the data may be transferred and (ii) the conditions under which the data may be transferred to the one or more devices. A first data management and control system to be used on a first device is defined. A second management and control system to be used on a second device is defined. The second data management and control system is distinct from the first data management and control system. The first data management and control system is instantiated on the first device. Data on the first device and/or second device are managed in accordance with the policy.

Another aspect provides a computer readable medium comprises code that, upon execution by one or more computer processors, implements a method comprising identifying controlled data using a first local enclave instance (LEI) on a first device. The first LEI includes one or more policies regulating usage and/or access rights to the controlled data. A request is received to transfer the controlled data from the first LEI to a destination residing in (i) an application external to the first LEI and on the first device, (ii) a second LEI, or (iii) a second device. One or more attributes of the destination are determined. The request is permitted or denied based upon a processor-assisted comparison of the one or more attributes against one or more attributes for permitting data transfer provided in the one or more policies.

Another aspect provides computer readable medium comprising code that, upon execution by one or more computer processors, implements a method comprising identifying controlled data using a first local enclave instance (LEI) on a first device. The first LEI includes one or more policies regulating usage and/or access rights to the controlled data. A destination location residing in (i) an application external to the first LEI and on the first device, (ii) a second LEI, and/or (iii) a second device is identified. One or more attributes of the location are then determined. Next, the one or more attributes are compared against one or more attributes for permitting data transfer provided in a policy. Transfer of the controlled data to the destination location is then permitted based upon the comparison.

Another aspect provides a computer readable medium comprising code that, upon execution by one or more computer processors, implements a method comprising identifying controlled data on an electronic device of the user. Next, a first set of attributes of the electronic device and/or storage location of the electronic device having the controlled data is determined. The first set of attributes is then compared against a second set of attributes for permitting usage of and/or access to the controlled data. The second set of attributes may be provided in a policy of an enclave. The user is then permitted to use and/or access the controlled data based upon the comparison. In an example, the user is permitted to use and/or access the controlled data if the first set of attributes matches the second set of attributes.

Another aspect provides a method for operating a device to manage and control data, comprising (a) identifying controlled data using a first local enclave instance (LEI) on a first electronic device, said first LEI having one or more policies regulating usage and/or access rights to said controlled data; (b) receiving a request to transfer said controlled data from said first LEI to a destination residing in (i) an application external to said first LEI and on said first electronic device, (ii) a second LEI, or (iii) a second electronic device; (c) determining, with the aid of a processor, one or more attributes of said destination; (d) permitting or denying the request of (b) based upon a processor-assisted comparison of said one or more attributes determined in (c) against one or more attributes for permitting data transfer provided in said one or more policies.

Another aspect provides a method for enabling a user to manage and control data, comprising (a) identifying controlled data using a first local enclave instance (LEI) on a first electronic device, said first LEI having one or more policies regulating usage and/or access rights to said controlled data; (b) identifying, with the aid of a processor, a destination location residing in (i) an application external to said first LEI and on said first electronic device, (ii) a second LEI, and/or (iii) a second electronic device; (c) determining one or more attributes of said location; (d) performing, with the aid of a processor, a comparison of said one or more attributes determined in (c) against one or more attributes for permitting data transfer provided in a policy; and (e) permitting transfer of said controlled data to said destination location based upon said comparison of (d).

Another aspect provides a method for enabling a user to use and/or access data, comprising (a) identifying controlled data on an electronic device of said user; (b) determining, with the aid of a computer processor, a first set of attributes of said electronic device and/or storage location of said electronic device having said controlled data; (c) performing, with the aid of a computer processor, a comparison of said first set of attributes determined in (b) against a second set of attributes for permitting usage of and/or access to said controlled data, wherein said second set of attributes is provided in a policy that is associated with the use and/or access of said controlled data on said electronic device; and (d) permitting the user to use and/or access said controlled data based upon said comparison of (c).

Another aspect provides an electronic device comprises a memory location, comprising a plurality of local enclave instance (LEI) engines adapted to provide management and control of data on said device; and a local controller in communication with a policy source, wherein said local controller is programmed to (i) select a given LEI engine from said LEI engines in said memory location and in accordance with one or more LEI specifications provided by a policy obtained from said policy source, and (ii) instantiate, with the aid of a computer processor of said local controller, said given LEI engine on said device, wherein said given LEI engine, upon instantiation, provides management and control over one or more data on said device in accordance with management and control specifications of the policy.

Another aspect provides a method for operating a distributed data management and control environment, comprising (a) providing a policy for the identification of data to be managed, wherein said policy identifies (i) one or more devices that said data may be transferred to and (ii) the conditions under which said data may be transferred to said one or more devices; (b) defining, with the aid of a computer processor, a first data management and control system to be used on a first device; (c) defining, with the aid of a processor, a second management and control system to be used on a second device, wherein said second data management and control system is distinct from said first data management and control system; (d) instantiating said first data management and control system on the first device; and (e) managing data on the first device and/or second device in accordance with the policy.

Another aspect provides machine-executable code that, upon execution by one or more computer processors, implements any of the methods above or elsewhere herein.

Another aspect provides a system comprising a memory location comprising machine-executable code implementing any of the methods above or elsewhere herein, and a computer processor in communication with the memory location. The computer processor can execute the machine executable code to implement any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGS." herein) of which:

DETAILED DESCRIPTION

Figure 1:
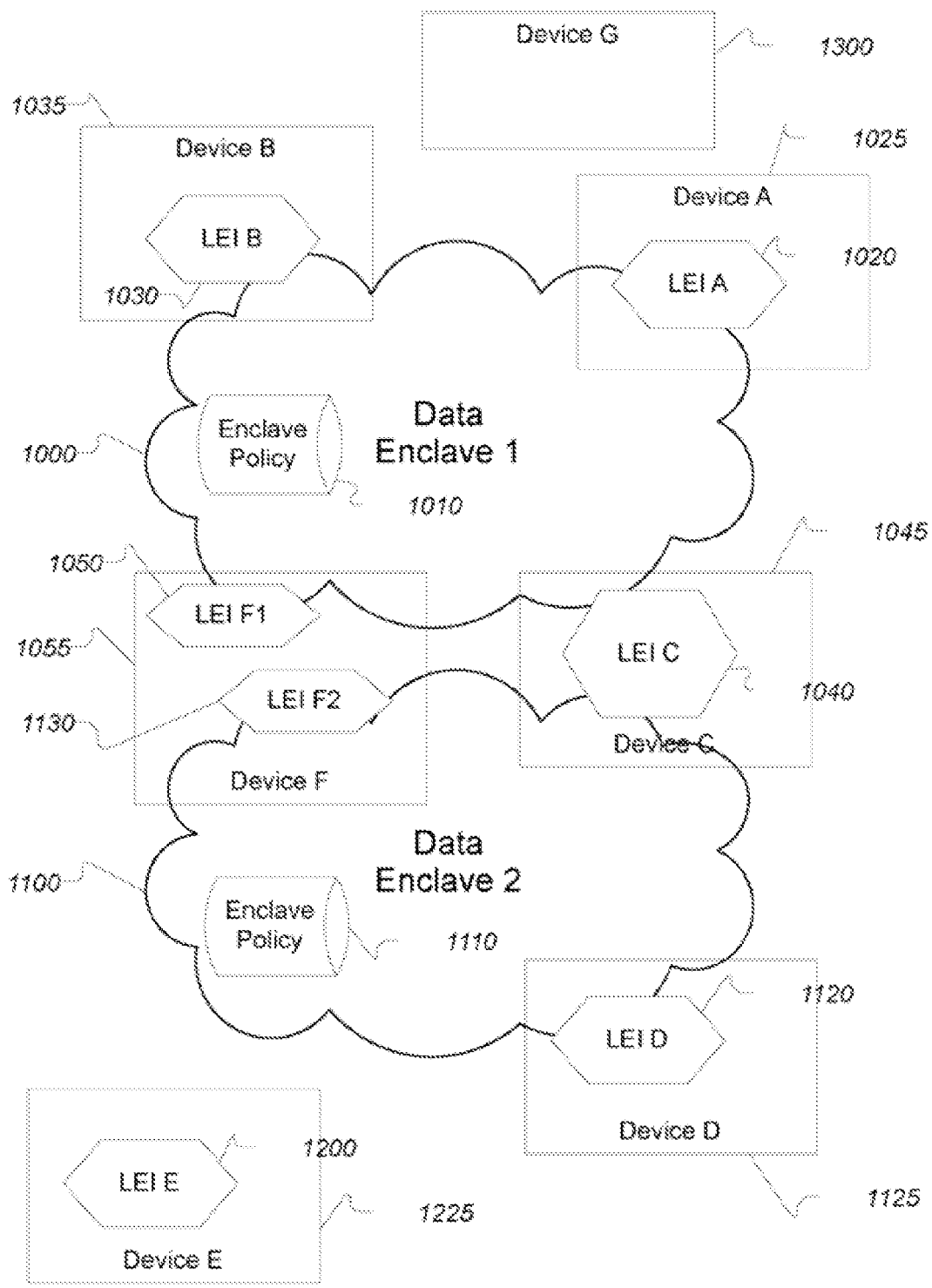
FIG. 1 illustrates exemplary sets of distributed enclaves as supported by the described technology.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

The term "device," as used herein, generally refers to an electronic device that is configured to implement the methods of the disclosure. Examples of devices include, without limitations, portable electronic devices, such as telephones ("phones"), Smart phones (e.g., Apple® iPhone, Android® enabled phone, Windows mobile enabled phone), slate or tablet personal computers (e.g., Apple® iPad, Samsung Galaxy Tab), laptop computers (e.g., Apple® MacBook Pro, Dell® laptop), desktop computers, computer servers, computer mainframes, and personal digital assistants.

The term "control," as used herein, generally refers to data control. Control may refer to permitting or denying access to, alteration of, permission to create data. In some examples, control comprises the methods and systems for: (a) Permitting or denying access to managed and controlled data; (b) Permitting or denying alteration of managed and controlled data; (c) Permitting or denying permission to create managed and controlled data; (d) Permitting or denying co-mingling of managed and controlled data in a first enclave with other data (either in a second enclave or simply present on the device); (e) Permitting or denying deletion of managed and controlled data; (f) Permitting or denying the movement of managed and controlled data in and out of the device; (g) Specification of the approaches that may be permitted for moving the data between enclaves and enclave instances when the movement of the data is permitted; (h) Permitting or denying the inclusion of a local enclave instance (LEI) and/or device in the enclave based upon any of (1) device and/or LEI identification, (2) device and/or LEI capabilities (e.g., types of protection, management, or control provided), (3), device and/or LEI attributes, and/or (4) other LEI currently instantiated on the device; (i) Type of enclave instances permitted and/or required, based upon any of (1) device and/or LEI identification, (2) device and/or LEI capabilities (e.g., types of protection, management, or control provided), (3), device and/or LEI attributes, and/or (4) other LEI currently instantiated on the device; (j) Identification of applications permitted or denied rights to access specific data.

Policies can define expressions of management and control. Policies can include specifications for the management and control for the device itself (e.g., device policies), one more local enclave instances present on the device (e.g., LEI policies), and/or one or more enclaves (which may or may not have a LEI on the device) (e.g., enclave policies). Device, LEI, and enclave policies may be (a) kept separately, (b) intermingled, or (c) integrated into a single monolithic policy, depending upon the implementation requirements. In some cases, policies are provided from a device (or system) external to the device or system having an enclave and a policy associated with the enclave.

Policies may be defined using a user interface, such as a graphical user interface (GUI), on a device. These policies may be referred to as "locally defined policies." Other policies may be defined at a central location and downloaded into a device. These policies may be referred to as "remotely defined policies."

The term "enclave," as used herein, generally refers to a virtual management and control domain that can be used in a single device and/or extend over a plurality of devices. In an enclave data may be managed and controlled in accordance with policy as specified by a controlling entity for that enclave. In some examples, an enclave is defined by: (a) a set of data that is managed and controlled in accordance with management and control specifications provided by a controlling entity, (b) a set of devices upon which the managed and controlled data is permitted to be present, (c) a defined set of management and control components, effective to provide the specified management and control upon data present upon one or more devices, (d) a set of management and control definitions that define (a), (b), and (c) (e.g., one or more policy(ies)).

In some embodiments, enclaves are distributed across a plurality of devices. Each device may be of a similar or disparate type (e.g., cell phone, laptop computer, server computer), have similar or dissimilar operating systems, and may provide similar or differing data protection mechanisms. Distributed enclaves may provide numerous advantages over previous mechanisms that provide data management and control in that, for example, they do not require similar mechanisms to be present on all devices, nor do they require identical or even similar data protection mechanisms on each of the devices. A key recognition is that the mechanism of data management and control is not as important as that the data is actually managed and controlled in a manner that meets the desires of the controlling entity.

Data defined by one or more policies of an enclave and managed and controlled by one or more LEIs, which may be defined by the one or more policies of the enclave, can be characterized as being within the enclave, in some cases regardless of the physical location of the data.

Enclaves differ from traditional information control schemes in a number of ways. Enclaves may be inherently distributed without a requirement for a common trust to be established between the systems. In this way, enclaves are more robust than traditional distribution of common MAC and DAC-based systems, which may require common, real-time connections and shared levels of trust between participating devices. Enclaves may also be distinguished from traditional rights management-based schemes, such as those provided by Adobe®, in that they do not require a common mechanism for data protection across platforms.

Some embodiments provide enclaves that are further differentiated over current data tagging and tainting schemes in that: (a) the data management and control method used may be defined by externally defined policies and is independent of the tagging and tainting implementations, (b) the data management and control methods may cross protection boundaries of disparate devices, (c) the data management and control methods may cross protection boundaries between dissimilar management and control techniques. Enclaves of the disclosure advantageously provide the flexibility of data control across multiple systems and devices without the need for having a uniform working environment.

Enclaves may be further differentiated over current synchronization techniques in that data may be aggregated from common sources, used on a specific device within a specific enclave instance, and then be de-aggregated and moved to other enclaves and/or enclave instances without loss of management and control. Furthermore, these movements may be bi-directional, or even constructed so that they are not solely between two different devices.

Enclaves and enclave instances (e.g., LEIs) may be individually identified using globally unique identifiers (GUIDs), or other identification approaches. This permits reference to particular enclaves and/or enclave instances in exchanges between aspects of the system, and association of data and policies with specific enclaves and enclave instances.

Methods of the disclosure may be implemented with the aid of systems and devices that implement policy so as to manage and control data in accordance with the policy specifications of an enclave. Systems and methods of the disclosure can be implemented on a single device, or can be implemented on (or across) a plurality of devices of the same or of disparate types. For instance, enclaves may be implemented on portable electronic devices, such as Smartphones (e.g., Apple® iPhone, Android-enabled device), tablet or slate personal computers (e.g., Apple® iPad, Samsung® Galaxy Tab), or laptops (e.g., Dell® laptop, Apple® MacBook Pro). Systems and methods of the disclosure may be used in mobile and distributed computing, and information security.

The term "local enclave instance" (LEI), as used herein, generally refers to the portion of an enclave that is instantiated on a particular device. In some examples, an LEI comprises one or more LEI components that enforces the enclave's policies on data that is in the enclave. An LEI component is the hardware, firmware, operating system software module, application "shim" component, and/or application software modules that provide the features and capabilities described herein. A single device may support one or more LEIs simultaneously, without the requirement that each of the supported LEIs utilize the same management and control technologies and/or governing rules. A single LEI may support a plurality of enclaves simultaneously. Data within each LEI that is present on the device is managed and controlled in accordance with the policies of the respective enclave(s).

The term "entity," as used herein, generally refers to one or more individuals, groups of individuals, companies, enterprises, government agencies, partnerships, etc. with data to be managed and controlled. Within the system, an entity can be represented using a digital identifier.

The term "controlling entity," as used herein, generally refers to an entity that is authoritative (or configured) to specify controls over one or more datum that are applied on one device or across a set of distributed devices. In some examples, the specification for these controls is provided by at least one policy, which is used by the system to form an enclave. The controlling entity for an enclave may delegate some or all control of the enclave to another entity.

Each controlling entity may specify differing control specifications for their controlled data. For example, a given entity may have some data that is private and requires strong limitations on access, storage and movement, while the same controlling entity may have other data that is intended for sharing, but requires control over modifying the data and synchronization with an enterprise server. Similarly, two or more controlling entities may independently define policies that are aggregated by a device and used to define the protection and controls provided by at least one LEI on the device. Creation of a single control policy that meets both needs is possible, but it often is simpler (or more aligned with the rights of the controlling entities) to create distinct policies, each of which specifies a desired level of restriction on data use, and associate private data with one, and sharable data with another.

A controlling entity may define as many enclaves as needed or otherwise necessary, and associate data with enclaves as appropriate to the control requirements for the data. Each enclave can have its own policy specification, and each datum is in at most one enclave at a time. It is possible for data to exist outside of any enclave, in which case the data may not be controlled by enclave policy.

Data under control of a given policy may be characterized herein as being in the same "enclave." As used herein, the term "data" generally refers to raw data (e.g., unorganized facts, unprocessed data, or various collections of bits) and processed data (e.g., data that is processed, organized, interpreted, structured, or presented in a particular context). Data may reside in a computer readable file, which file may be accessible through software on an electronic device of a user. In some cases, data may be encrypted.

Data within an enclave can be characterized as being part of that enclave in a persistent manner. The specific method used to associate data with an enclave may vary by enclave implementation or by device. For example, in a first exemplary implementation, the system may associate data with an enclave by "tagging" data with an enclave-specific identifier, where the tags are stored intermingled with the data. In a second exemplary implementation, the system may associate data with an enclave by tagging data with an enclave-specific identifier, where the tagging is stored separately from the data. In a third exemplary implementation, the system may tag data by storing a description of the data and its enclave association separate from the data. In each of these cases, the association between specific tags and enclave is made by the corresponding enclave policy. In a fourth exemplary implementation, an enclave's data may be stored in particular (e.g., enclave policy specified) locations, and all data stored in the particular location is considered to be part of the specifying enclave. Similarly, in other implementations, enclave data may be stored in specific files on a file storage system. In still other implementations, the data may be stored in a database.

In each case, enclave policies may be applied to the data as it is accessed and accesses to the data mediated in that manner. In some implementations, the enclave policies may be translated to underlying access controls (such as file system ACLs or database permissions) and access to the data is then mediated using these controls.

In some exemplary implementations, data is identified for only the current enclave that the data is in. In alternative exemplary implementations, data is identified in ways to associate it not only with the data's current enclave, but also with enclaves for which the data has previously been associated. Such historical references may be used to permit continued (persistent) enforcement of prior enclave policies as data is moved or copied across enclave boundaries. In at least some of these exemplary implementations, such persistent enforcement may be a condition of such movement or copying.

In at least some exemplary implementations, data identification is persistent even as data is being processed by applications. One mechanism is to tag the data itself, the other is to persistently manage the interfaces of the application and to maintain the identification as data is moved in and out of applications. By tracking data and its identification through application processing, appropriate identification of data may be maintained, even when an application accesses data from a plurality of enclaves. This may require that applications be limited to importing data from a single enclave, unless enclave policy for the data involved permits otherwise.

The following are exemplary and non-limiting definitions of terms used herein:

| Term | Abbreviation | Definition |
| --- | --- | --- |
| Identification | | Association of a particular data or set of data with an enclave. May comprise an identification (e.g., ID), one or more associations of the ID with at least one enclave, and optionally, link definitions and/or tag specifications, depending upon LEI implementation. |
| Cooperative Application (App) | | An application that is designed to be cooperative with an enclave system. This may, for example, mean that the application maintains the associations of enclave data itself, enforces enclave policy with respect to data movement, etc. |
| Non-Cooperative Application (App) | | An application that is not designed to be cooperative with an enclave system, and provides no support for enforcement of enclave policy on enclave data. |
| Encapsulation | | Modifying an application by adding capabilities for enclave policy control of the application's interaction with or use of resources, other applications, the OS or device hardware, such that the capabilities are invoked along with the application when it is instantiated. |
| Local Enclave Instance | LEI | That portion of an enclave system that is instantiated on a particular device. |
| Modding | | Altering an OS or application by code change, use of plug-in modules, or by alteration or replacement of support libraries. |
| Patching | | Modifying an application's code after the application is built so as to change its behavior. |
| Shimming | | Inserting code between one or more applications and resources, other applications, the OS, or device hardware, such that the inserted code may control whether and how the one or more applications access the resources, other applications, OS, or device hardware. |
| Tagging | | Persistent association of data with at least one enclave. |
| Virtual Machine | VM | This may be a type 1 or a type 2 hypervisor. |
| Wrapping | | Replacing an application with a wrapper application that establishes a required environment, and then loads the application into that environment so as to permit the wrapper application to control the application's interaction with or use of resources, other applications, the OS, or device hardware outside of the required environment. |

Enclave Management Systems

An aspect of the invention provides a distributed enclave management system. The management system can include a computer server coupled to one or more devices, such as through a wired (e.g., coaxial) or wireless (e.g., WiFi, Near Field Communication, Bluetooth) interface, which may bring the server in communication with a device through a network (e.g., an intranet, the Internet). The distributed enclave management system may provide computer system components and method of operating these computer components in order to protect and manage data, its movement, and information leakage. The system may define or select data that may be available one or more computers. In some situations, the system also controls and mediates direct paths of data exchange, manages accidental improper sharing and co-mingling of data, and enables audit logging of data movement activities.

The system can be configured to implement enclaves on one or more devices, such devices located remotely with respect to the system. An enclave in some cases is a logical structure that comprises one or more local enclave instances (LEI) implemented on individual devices. Each LEI manages and controls data that is associated with the enclave(s) of which the LEI is a part. Typically, there is one LEI per enclave represented on the device. However, with some LEI engine technologies, a plurality of enclaves may be represented upon a device using a single LEI engine.

Within a device, an LEI manages and controls the data associated with the enclave(s) while that data is at rest, while that data is in use within the LEI, and as the data moves between LEIs. The system may specify the types of LEI engines used for a specific device, how the data is protected while at rest, the applications that are permitted to access the data, the manner and conditions under which the applications are allowed to move the data, and the other LEIs to which they are permitted to move the data. In some cases, if the policies defining the respective enclaves permit it, managed and controlled data may be moved between enclaves.

The system can be configured (or programmed) to provide the control of distributed enclaves into one or more local enclave instances (LEI), and that the control mechanisms and communications between the LEIs are controlled in accordance with an enclave policy specification, which may be provided by the system. Distributed enclaves comprising a plurality of different LEI types permit the inter-operation of unlike systems. This permits the inclusion of and interaction with commonly available "cloud" or Software-as-a-Service architectures that may not be aware of specific data management and control schemes. For example, an enclave may be defined in order to manage and control corporate contact data. This enclave comprises a set of devices with individual LEIs, e.g., (a) the user's cell phone, (b) an enterprise collaboration server, and (c) the SaaS CRM application. Each LEI uses a different technology to manage and control the data.

Enclave policy may further define the nature of management and control within an LEI by defining the applications that may be used with the data. For example, the policy may define that contact data is stored in the local contact database while on a cell phone device and in database systems while on corporate servers. Enclave-specific policy may further define that only corporate-originated information may be moved between an electronic device (e.g., cell phone) and enterprise servers, such as the enterprise collaboration server or the SaaS CRM system, and, in some cases, only when the data is protected in transit, such as via encryption. The policy can further specify that the LEI engine to use on the electronic device is a combination of data at rest and data in motion. This may be accomplished with the aid data tagging.

Contact information may be managed and controlled while at rest on the phone using a phone local data tagging technique supported by the phone's LEI, in the enterprise server by storing it in an ACL controlled database application such as, for example, Microsoft's SharePoint, or while in an SaaS instance of Salesforce® or within the Salesforce database application. Communications between these systems may be protected using a protocol that provides communication security, such as, for example, transport layer security (TLS) or secure socket layer (SSL).

The system enables an LEI to have device-specific control mechanisms. For example, a portable electronic device (e.g., Apple® iPhone) can employ a data tagging method of management and control, an enterprise server can use standard access control lists (ACL's), and a customer relationship management (CRM) system, such as Salesforce®, can provide user separation built into the application. In such a case, managed and controlled contact data stored in each of the three LEI are managed as a single set of data. In some cases, a user's personal contact information may not be synchronized with either the corporate server or CRM system. Similarly, it can permit and enforce synchronization of company phonebook information only with the enterprise server, and permits and enforces synchronization of the sales leads contact information only with the CRM system. This advantageously enables users to data from various sources combined transparently at their application while still managing the data so it is returned to its information repository of record.

A given device may have a plurality of LEIs, each being controlled as part of a different enclave. Each enclave can protect a different type of data and potentially having distinct policies defined for each enclave. A given LEI among a plurality of LEIs can be different from all other LEIs among the plurality. Each of the plurality LEIs may be defined as using a different control mechanism. For example, a first LEI on a device may provide management control of the data using data tagging or "tainting" approaches embedded in the operating system of the device, a second LEI on the device may provide management and control of the data by application wrapping techniques, and a third LEI may provide management and control of the data using a hypervisor. Each LEI is managed in accordance with the enclave policy defined for the enclave to which the LEI belongs. Each enclave policy may be commonly or independently defined, and may be created on the device or may be retrieved (e.g., downloaded) from the system.

Similarly, differing enclave instances may require or support different forms of data management due to hardware or software differences on various devices. In some situations, the system is configured to map enclave policy to various devices despite these differences, and is further configured to enforce enclave policy. This approach advantageously allows the use of many different control technologies without limiting the types of devices to which the distributed enclave system may be deployed. Furthermore, it permits the selection of LEI implementation technologies that most effectively protect and manage the types of data to be managed. For example, if the data being managed are corporate spreadsheet files, certain LEI implementation techniques may be effective. However, if the data being managed are contact records, an LEI implementation technique that is able to identify records as they are read and written by applications may enable management of the records.

FIG. 1 illustrates distributed enclave environment (or deployment). A given device may support a plurality of LEIs, a single LEI, or no LEIs. A plurality of LEIs on a given device may support the same enclave, different enclaves, or any combination of enclaves. The illustration depicts two enclaves (1000 & 1100), each of which has its own policy specification (1010 & 1110). The policy (1010) specification of Enclave 1 (1000) permits LEI A (1020), LEI B (1030), LEI C (1040), and LEI F1 (1050) to participate in Enclave 1 (1000), while the policy (1110) of Enclave 2 (1100) permits LEI C (1040), LEI D (1120), and LEI F2 (1130) to participate as part of Enclave 2 (1100). An LEI resides on a given device. For instance, LEI A (1020) resides on Device A (1025).

In some cases, the devices having the LEIs, namely Device A 1025, Device B 1035, Device C 1045, Device F 1055, and Device D 1125, may host applications that may utilize data in the respective enclave(s), and have that use of the data managed and controlled in accordance with the enclave policy. Data use on a given device may be dependent on the policy of Enclave 1 or Enclave 2.

Enclave policies can define the protections, management, and controls for enclaves, as well as participating and non-participating devices, applications, and permitted and/or required enclave technologies as described elsewhere herein.

A "cooperative device" is a device that supports the ability to participate in an enclave (i.e., provide an LEI that complies with and enforces a particular enclave policy). A "non-cooperative device" is a device that does not support the ability to participate in an enclave. Cooperative devices may participate in a given enclave.

A "participating device" is a device that is capable of participating in an enclave and is permitted by a policy of the enclave to participate in the enclave. The LEI(s) on such devices may be referred to as "participating" LEI(s).

A cooperative device may be prohibited from participating in a given enclave by the enclave's policy, while, at the same time, participating in other enclaves where the policies do permit participation. For example, Device D (1125) hosts LEI D (1120) which participates in Enclave 2 (1100), but device D (1125) is prohibited from participating in Enclave 1 (1000) since its LEI (1125) is not permitted to participate in that enclave. The device hosting LEI C (1045) is permitted to participate in both Enclave 1 (1000) and Enclave 2 (1100) because its LEI (1040) is permitted to participate in both Enclave 1 and Enclave 2. Device F (1055) is permitted to participate in both Enclave 1 and Enclave 2 because it supports two LEIs, F1 (1050) and F2 (1130), each of which is permitted to participate in one of the two enclaves. Device E (1225) may not participate in either enclave, because its LEI (1200) is not permitted to do so. Since Device E (1225) supports at least one LEI, it is a cooperative device even though it is not participating. In some implementations, LEI's may be implemented using the same underlying LEI implementation technologies, and in other implementations, the LEIs can be implemented using differing LEI implementation technologies. The simultaneous use of differing LEI implementation technologies permits the distributed enclave management system to support a plurality of enclave specifications and requirements, and to integrate these systems and requirements at the participating device. This sets the distributed enclave management system apart from monolithic systems that require all protections to be managed using the same techniques.

Non-cooperative devices, such as device G (1300) do not participate in either enclave. Note that if an enclave's policy permits data transfer to or from non-cooperative devices, applications hosted on device G (1300) may still be able to exchange data with applications on participating devices, such as device A (1025), device B (1035), device C (1045), device D (1125), device F (1055), or device E (1225). Such exchanges may result in loss of control over any data transferred from an LEI on any of the participating devices to device G (1300). Non-cooperative devices do not enforce enclave policies, and may not preserve the association of data with its enclave.

Cooperative, but non-participating LEIs, such as the LEI E (1200) of device E (1225), may not adhere to the policies of the enclaves in which the other devices participate, and may have policies for use in such situations that are incompatible with the policies of the other enclave involved in any data transfer or may not support capabilities required to adhere to the policies of an owning enclave. Transfer of data from an enclave to a non-participating device or LEI may result in loss of control over the data transferred. Unlike a non-cooperative device however, a cooperative but non-participating device does support at least one LEI, and the LEI on the cooperative but non-participating device may be queried by a LEI of the data owning enclave prior to any transfer of data to determine how the data will be handled. If the sending LEI finds the response to be unacceptable in light of enclave policy, it may cancel the transfer.

Similarly, if a user desires to include a cooperative, but non-participating LEI or device within an enclave, and the enclave policy permits the inclusion of LEI and devices based upon the types of protections provided by the LEI and/or device, the device and/or the LEI may be added to the enclave.

Figure 2:
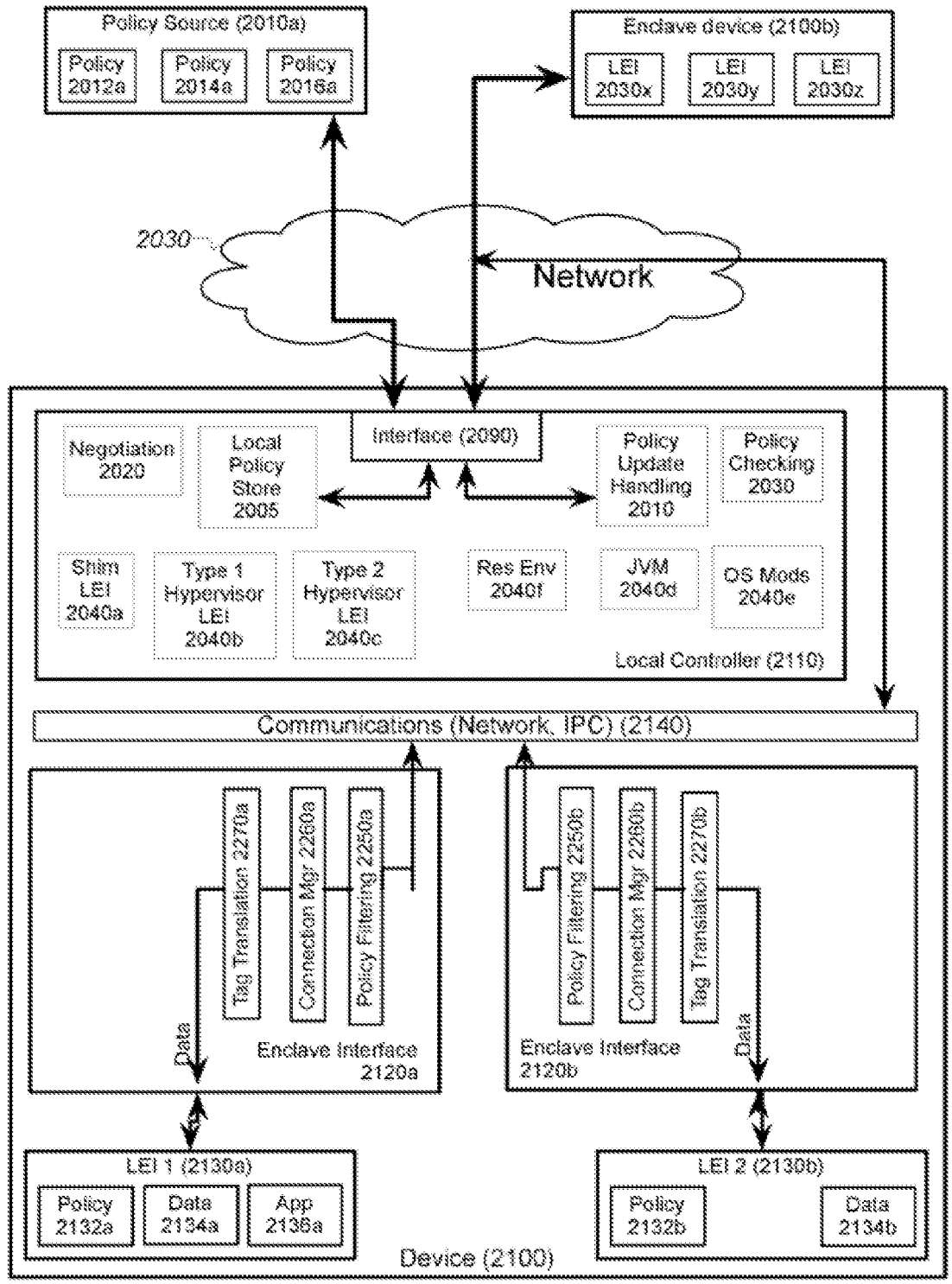
FIG. 2 depicts a device implementing the described technology supporting a plurality of local enclave instances (LEIs) and supporting modules, including a local controller module and an inter-enclave interface, in accordance with an embodiment of the invention.

FIG. 2 illustrates a cooperative system, in accordance with an embodiment of the invention. The system includes a device (2100), which can be a computing device that may include distributed enclave components. The distributed enclave components are included in a local controller (2110), one or more enclave interface(s) (2120*a*, 2120*b*), at least one local enclave instances (e.g., 2130*a*, 2130*b*), and at least one communications interface (2140). Each LEI further comprises LEI policies (2132*a*. 2132*b*), and managed and controlled data (2134*a*, 2134*b*). An LEI may optionally further comprise controlled applications (2136*a*). Each cooperative device is connected via a network (2030) to one or more policy sources (e.g., 2010*a*, 2100*b*) and other participating devices (e.g., participating device 2100*b*). The policy sources may provide one or more policies to the cooperative device. These policies are used by the distributed enclave components to define the construction, management, and control of the LEIs supported on the cooperative device. The participating devices may provide and/or receive data from the example device, and may optionally act as a policy source.

The cooperative device 2100 can be a computer system that is configured to manage and control one or more datum, and to enforce the management and control data at rest and data in motion between applications, other LEIs, and participating devices.

A system or device, such as a cooperative device, can be a mobile device (e.g., Smart phone, tablet personal computer), desktop computer, laptop computer, embedded computer (e.g., set-top boxes), or server (or sets of servers operating together). A device or system can include hardware and software, and in some cases a user interface, such as a graphical user interface (GUI), which may be implemented on a display of the device or system. A user may interact with a user interface with the aid of a computer pointing device, such as a mouse or a touch screen (e.g., capacitive touch screen, resistive touch screen). A system or device can also include one or more computer processor(s), memory (e.g., read-only memory, random-access memory, flash memory) and electronic data storage (e.g., hard disk). A system or device can include an operating system and the applications that it supports.

In some examples, devices, such as cooperative devices, may rely upon specific hardware, device-level, operating system (OS) or application components, as well as physical, operational, and technical security measures as are deemed necessary by those skilled in the art. For example, a large SaaS vendor, such as SalesForce®, may implement their enclave protections using software built upon the protection capabilities of an existing underlying database. Once a controlling entity is assured that these protections are sufficient for business purposes, they may craft policies that permit managed and controlled data to be moved to these systems.

Other cooperative devices, such as a mobile device (e.g., cellular telephones) having a mobile operating system (e.g., iOS, Android, Windows mobile operating system), may implement LEI components as software and/or hardware components embedded in, and extending, the mobile operating system and/or the underlying firmware (e.g., BIOS). In other examples of cooperative device implementations, a set top box may implement its LEI components in a combination of hardware, firmware, and device-local read/write memory.

Cooperative devices may be connected with other cooperative devices using communications interfaces, such as, for example, networking (e.g., local area network, WiFi) and intra-device (e.g., Bluetooth) interfaces. Such interfaces may include traditional networking technologies, including Ethernet, fiber optics and wireless (e.g., Bluetooth, Near Field Communication, WiFi) networking. Use of inter- and intra-device communications interface (2040) are also managed and controlled by the local controller. All forms of data movement over these communications interfaces may be controlled, including sharing over a network link, data exchange cable, short-range wireless data links (Bluetooth, IrDA, etc.), or inter-process communication.

Protection requirements for data that is in transit between applications, LEI, and devices, i.e., "data in motion", may be specified by enclave policy. Enclave policy may require that data be encrypted while it is being sent or permit it to be sent "in the clear". Enclave policy may require that data transit meet given requirements for authentication of the destination or source and/or validation of correct transfer (e.g., require the presentation of a specific certificate by the remote device), or that specific protocols be employed (e.g., HTTP, SHTTP, RCP tunneled through SSH, SFTP, SCP, etc.). Specific paths, such as requiring use of a particular Virtual Private network (VPN), or restriction against Bluetooth transfer, or other restrictions, such as time of day, device location, or application used, may also be specified in policy.

With continued reference to FIG. 2, the local controller (2110) comprises a local policy store or repository (2005) and policy update handler (2010), which interoperates with the interface (2090) to communicate with policy sources over a network. A user interface component (not shown) permits authorized users to enter and modify policies in the policy store. Other policy management components include a negotiation component (2020), which is used to negotiate policies with policy sources, and a policy-checking component (2030), which detects conflicts in policies, determines if a specific cooperative device may implement the policy, and determines if a policy applies to a specific operational scenario.

The local controller further comprises one or more LEI engines (e.g., 2040*a*, 2040*b*, 2040*c*, 2040*d*, 2040*e*, etc.) that may be used to control data in various circumstances. These LEI engines are instantiated by the local controller when needed to implement one or more aspects of a policy.

The device 2100 further includes enclave interfaces (2120*a*, 2120*b*). An enclave interface mediates data movement between a first LEI to a second LEI or other participating device. The data movement is shown as uni-directional from an LEI to the communications interfaces for purposes of illustration. The enclave controller may also mediate data movement from the communications interfaces to an LEI as well by implementing a mirror copy of the communications path thru the enclave interface. This permits the bi-directional management and control of data at the enclave interface. The enclave interface may mediate any communications between applications, LEIs, and/or participating devices, including network connections, inter-process communications, and other communications mechanisms as described herein. The enclave interface (2120) is implemented either as part of the local controller, as part of each LEI, and/or as an independent aspect of a cooperative device. The enclave controller communicates with the one or more LEI's (2130*a*), receiving data (2280) communicated from the LEI (2030*a*) destined for a destination device and/or LEI (e.g., 2120*b* or 2100*b*). This data movement is subject to policy-based management and control provided by policy filter (2250*a*), connection manager (2260*a*), and tag translation (2270*a*) components of the enclave interface. The enclave interface may share the negotiation and policy checking components of the local controller, or may provide its own versions of these components.

Figure 7:
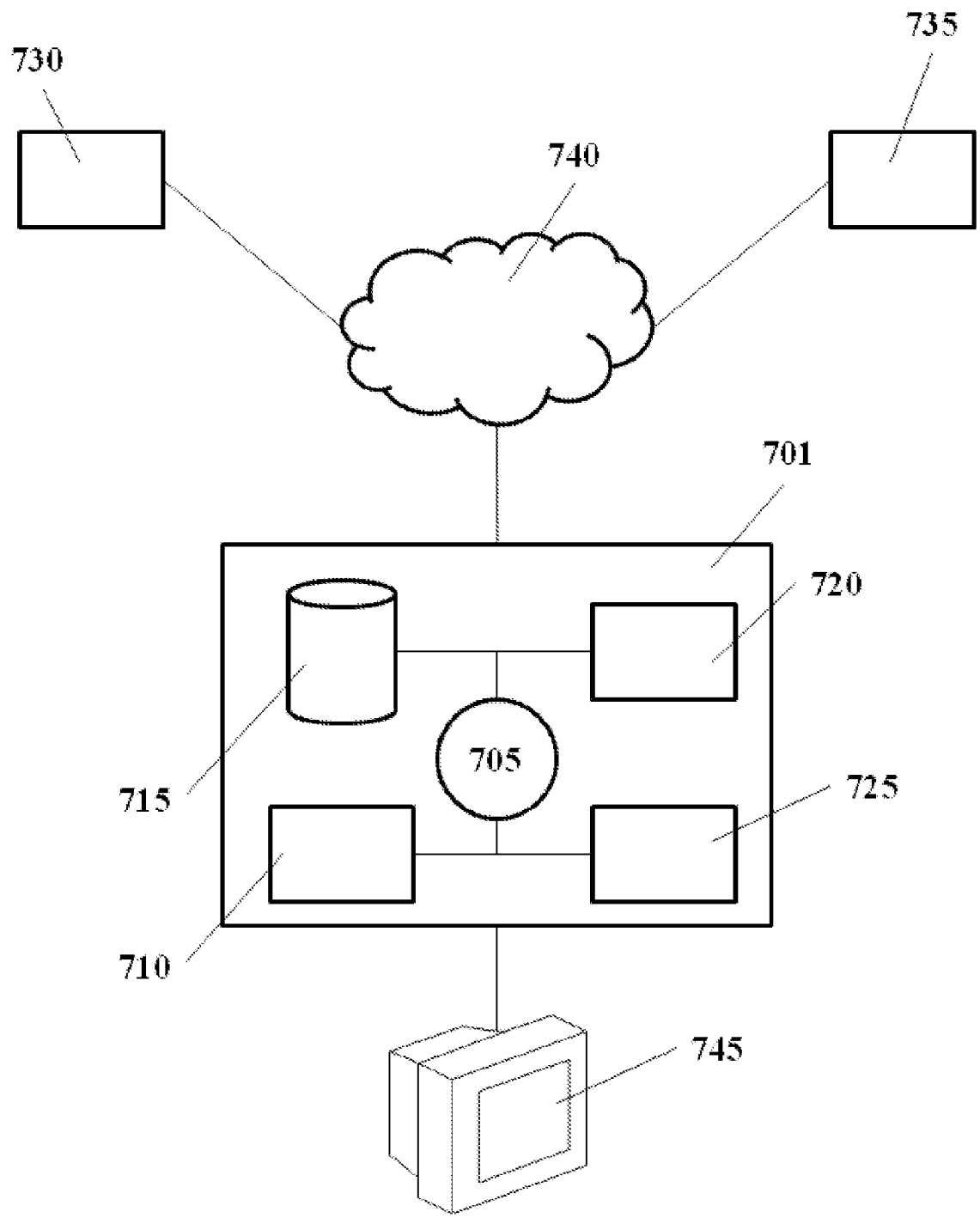
FIG. 7 schematically illustrates a system for implementing an enclave and providing usage policies, in accordance with an embodiment of the invention.

FIG. 7 shows a system 700 that can be programmed to implement methods of the disclosure. The system 700 comprises a server 701 having a computer processor 705, memory 710, electronic storage unit 715 (e.g., hard disk), a communications interface 720 and peripheral devices or components 725, such as display interface. The communications interface 720 enables the server 701 to communicate with electronic devices 730 and 735 through a computer network ("network") 740. The server 701 is coupled to an electronic display 745.

The computer processor 705 can be a central processing unit (CPU, also "processor" and "computer processor" herein), which can be a single core or multi core processor, or a plurality of processors for parallel processing. The memory 710, storage unit 715, communications interface 720 and peripheral devices 725 are in communication with the CPU 705 through a communications bus (solid lines), such as a motherboard. The storage unit 715 can be a data storage unit (or data repository) for storing data. The server 701 is operatively coupled to the network 740 with the aid of the communications interface 720. The network 740 can be the Internet, an internet and/or extranet, or an intranet and/or extranet that is in communication with the Internet. The network 740 in some cases is a telecommunication and/or data network. The network 740 can include one or more computer servers, which can enable distributed computing, such as cloud computing. The network 740, in some cases with the aid of the server 701, can implement a peer-to-peer network, which may enable devices coupled to the server 701 to behave as a client or a server.

Methods provided herein can be implemented by way of machine (or computer processor) executable code (or software) stored on an electronic storage location of the server 701, such as, for example, on the memory 710 or electronic storage unit 715. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The storage unit 715 can store files, such as files related to user profiles and security. The server 701 in some cases can include one or more additional data storage units that are external to the server 701, such as located on a remote server that is in communication with the server 701 through an intranet or the Internet.

The server 701 can communicate with one or more remote computer systems through the network 740. In the illustrated example, the server 701 is in communication with the electronic devices 730 and 735 that are located remotely with respect to the server 701. The electronic devices 730 and 735 can be, for example, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. Each of the electronic devices 730 and 735 can include an electronic display.

In some situations the system 700 includes a single server 701. In other situations, the system 700 includes multiple servers in communication with one another through an intranet and/or the Internet.

The server 701 can be adapted to store user profile information, such as, for example, a name, physical address, email address, telephone number, instant messaging (IM) handle, educational information, work information, and social likes and/or dislikes. Such profile information can be stored on the storage unit 715 of the server 701.

Aspects of systems and methods provided herein, such as the server 701, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such memory (e.g., ROM, RAM) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The server 701 can be configured for data mining, extract, transform and load (ETL), or spidering (including Web Spidering where the system retrieves data from remote systems over a network and access an Application Programming Interface or parses the resulting markup) operations, which may permit the system to load information from a raw data source (or mined data) into a data warehouse. The data warehouse may be configured for use with a business intelligence system (e.g., Microstrategy®, Business Objects®). The system can include a data mining module adapted to search for media items in various source locations, such as email accounts and various network sources, such as social networking accounts (e.g., Facebook®, Foursquare®, Google+®, Linkedin®) or on publisher sites, such as, for example, weblogs.

Features and functionalities of systems of the disclosure can be implemented with the aid of an application ("app") residing on an electronic device, such as a portable electronic device (e.g., Apple® iPhone, Apple® iPad, Android® enabled phone), which electronic device can be in communication with a system (e.g., the system 700 of FIG. 7). An app can provide user-specific features and functionalities.

An app can be pre-compiled and installed on an electronic device of a user, or compiled and subsequently installed on the electronic device of the user. An app can provide various features and functionalities to the user, such as by way of a user interface, such as a graphical user interface (GUI), of the electronic device of the user. For example, each of the electronic devices 730 and 735 can include an electronic display for displaying a GUI to a user. In an example, an app can enable the user to view various policies associated with a given enclave, or to set usage and/or access rights in a policy, which may enable the user to regulate access to controlled data across multiple devices of controlled environments (e.g., LEI's).

With reference to FIG. 7, the server 701 can be a software-as-a-service (SaaS) based security management console. The server 701 may provide administrators various features and functionalities, such as the capability to add and enroll new users, assign users to groups, create and assign policies, and access audit and reporting information.

In some situations, a device includes an electronic display that displays data and applications. The electronic display can include a user interface, such as a GUI. In some examples, applications or data that is within an enclave is displayed differently on the electronic display than applications or data that is not within the enclave. For example, an application that is in an enclave can be marked by a given graphic (e.g., star, asterisk, shield, or lock symbol), and an application that is not in the enclave may not be marked with the given graphic.

In some examples, an electronic device in communication with the server 701, such as the electronic devices 730 and 735, may include an agent, which is software that facilitates the retrieval of policies and commands from the server 701 and implements those policies and commands on electronic the device.

The use and/or maintenance of LEI's on electronic devices can be facilitated with the aid of the interplay of software and/or hardware of an electronic device of a user (e.g., electronic device 730 or 735) and a server (e.g., server 701). An electronic device of a user can include an agent that comprises software adapted to monitor activity on the device and regulate access to data and/or applications on the device based on one or more policies.

Figure 8:
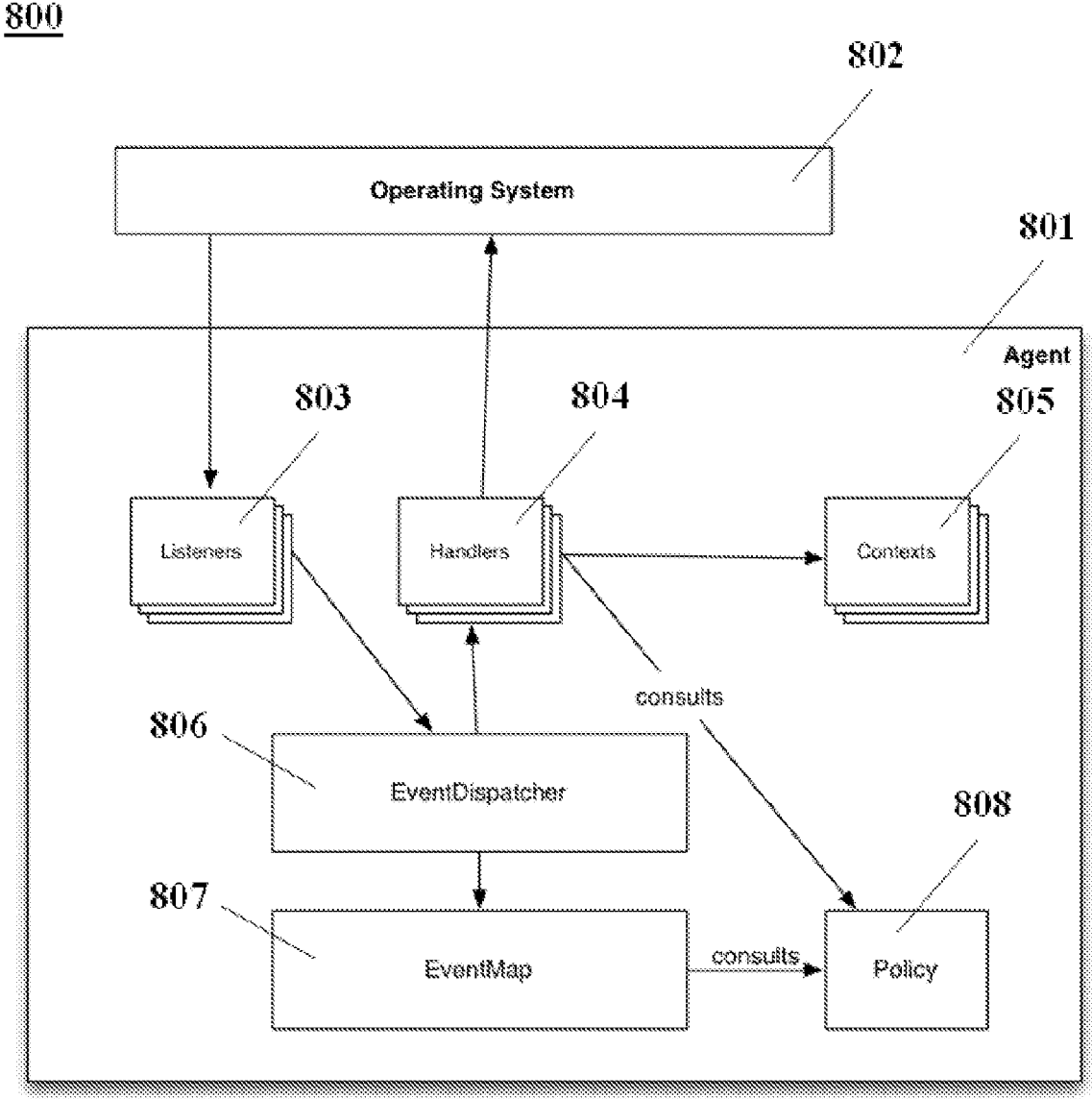
FIG. 8 shows a system that can be used to implement LEIs.

FIG. 8 shows an example of a system 800 that can be used to implement LEI's, in accordance with various embodiments of the present disclosure. The system 800 includes an agent 801 and operating system 802. The agent 801 includes various components, including listeners 803, handlers 804, context 805, an event dispatcher 806, an event map 807, and a policy 808. The components 803-808 can be hardware and/or software components of the agent 801. The agent 801 and operating system 802 can be included in an electronic device of a user (e.g., electronic device 730 or 735 of FIG. 7). The agent 801 can include one or a plurality of listeners 803. The agent 801 can include one or a plurality of handlers 806.

A listener 803 can be a thread of executable code that monitors for a given activity or occurrence in the operating system 802. When the listener 803 detects an activity that is being monitored, it generates an event (also "trigger event" herein) and sends it to the Event Dispatcher. The activity can be, for example, a user-initiated access (i.e., opening) of a file or application within an LEI of the electronic device.

In some examples, the listener 803 monitors activities by a delegate event model in which the listener 803 registers with the operating system 802 to be notified of an event, or by a polling approach in which the listener 803 actively samples the state of a given resource (e.g., system clipboard). Examples of activities include, without limitation, whether 1) an application is launched to the foreground, 2) the content of the system clipboard has changed, 3) an application has requested to share a file with one or more other applications, 4) an application has written data to removable media, and/or 5) the system has transitioned to hibernate or sleep mode. The listener can generate an event based on any one of these activities.

The agent 801 can include one or more listeners 803. If a plurality of listeners is used, each listener 803 can monitor and detect at least a subset of all activities that are being monitored. For example, a first listener can detect whether an application is launched in the foreground and a second listener can detect whether an application has requested to share a file with one or more other applications.

The handler 804 can be a thread of executable code that receives an event from the event dispatcher 806 and 1) takes action to enforce a policy from the policy 808, or 2) consults the appropriate context 805 and policy 808, and then generates a new event and subsequently directs the new event to the event dispatcher 806 to be dispatched to a different handler 804. Examples of actions include, without limitation, 1) locking the system (e.g., electronic device of the user), 2) suspending the foreground application, 3) removing the clipboard content(s), 4) restarting a task, 5) terminating all suspended or foreground applications, 6) enabling or disabling personal or local network communications (e.g., Bluetooth, WiFi, Near Field Communication), and/or 7) presenting the user with an authentication request (e.g., passcode or password, thumb scan (full or partial) and/or retina scan).

The event dispatcher 806 is called by either the listener 803 or handler 806 and provided with an event to dispatch to another handler. The event dispatcher 806 aids in routing an event to a proper handler.

The event map 807 maps an event to a handler 803. Mappings are either static or dynamic (e.g., computed at run time). Dynamic mappings can be based on a policy from the policy 808, or some attribute of the operating system (e.g. version of the operating system), but can be computed as a function of any arbitrary dynamic value. When an event arises, the event dispatcher 806 uses the event map 807 to determine which handler 804 to route the event.

The context 805 can be a data structure that represents the current mode of user operation. Examples of contexts include, without limitation, 1) protected application: an entity is interacting with a protected app, as defined by the policy 808; 2) internal: an entity is interacting with the agent 801; 3) critical application: an entity is interacting with an app; and 4) data sharing. A critical application may be similar to a protected application, but not explicitly specified in the policy 808.

The policy 808 can be a collection of configurations that can govern how the agent 801 is to control applications during run time of the electronic device and operating system 802. A single agent instance can accept, store, and implement multiple policies from various sources simultaneously. An agent instance can receive policies from various sources, including end-users via the user interface of the agent 801, or from an instance of the server via an agent management protocol. The event map 807 and handler(s) 804 can consult the policy 808 to determine whether a given action in view of a given event is in accordance with the policy 808.

LEI Implementation

In some embodiments, LEIs are configured to control data creation, access, use, movement, deletion, and protection for data within an enclave. On devices that natively support the capabilities required for enclave implementation, such as policy-controlled data access, operations, storage, and transport, data may be controlled as specified in enclave policies using such capabilities. On devices that do not support such capabilities, enclave implementation may require one or more LEI engines, such as: operating applications in an application virtual machine (AVM) environment with limited capabilities for interaction outside of the AVM (e.g., Java applets and JavaScript in browsers) (2040d); using Type I or Type II hypervisor virtual machines (VMs) (e.g., Xen or VMware) (e.g., 2040b, 2040c); using application "wrapping," "shimming," encapsulation, patching, or modding (2040a); using Operating System patching or modding (2040e); and/or using restricted execution environments (e.g., "chroot jails") (2040f).

Modification of an AVM environment that executes applications may be involve modification of the AVM itself, by modification or replacement of support libraries, device drivers, or other aspects of the environment created by an AVM, or both. Since applications in an AVM have no direct interface to the world except through the AVM, and the AVM controls and has access to all aspects of the application as it runs, all data access by and from the application may be mediated according to the policies of the enclave(s) to which the data belongs. The AVM may even track data as it moves through the application.

Type I and Type II hypervisors enable similar capabilities to the AVM method just described, but at a device level, rather than at an application level. Ability to mediate data access and export, or tracking within the application, is similar.

Application "shimming" involves installing one or more components that intercept communications and system calls between an application and underlying operating system (OS) functions, support libraries, device drivers, inter-process communication, device hardware, etc. One method of application shimming may be provided by establishing an environment for an application to run in where calls to Operating System (OS) and other functions are intercepted and diverted from their normal recipients and instead directed to code that is part of the application shim. The application is then loaded into this environment and run. When the application's makes a call to an OS functions to read data, establish network links, etc., these requests are mediated by the shim and only those that are consistent with enclave policy for the data involved are permitted to complete normally. Various methods for accomplishing this are well understood, and include wrapping, encapsulation, patching, and modding.

Operating system modifications may include permanently added components to a device's operating system, or may be provided as device drivers, dynamically loaded libraries, or by application level services.

A common example of a restricted execution environment is the "chroot jail", where an application operates within a restricted environment that has only the necessary components, such as runtime libraries, mapped into it, and has no direct access to other components that may normally be present under the host OS. Such methods may be combined with methods such as shimming to limit an application's access to data so as to enforce enclave policies.

Use of the above methods, or others that will be known to those with skill in the art, provide an LEI engine that is able to manage and control data used by applications so as to ensure that enclave policies for the data are enforced.

Policies

A policy can set restrictions as to data use, data editing, and data migration within an enclave, among enclaves, or among devices in an enclave or different enclaves. A policy can be provided by a policy source.

In some embodiments, a policy source is a policy server. A policy source may provide policy for an enclave upon the request of the local controller. In some implementations, the policy source is integrated with a cooperating or participating device. A policy source can be a standalone server in communication with a system for implementing one or more enclaves, or a sub-system (or module) in such a system.

Specification and implementation of policies (in general) may be provided in various formats (e.g., XML, rule sets, name/value pairs, etc.). Policies may be distributed with the aid of policy servers. In some cases, a policy includes enclave and data specific categories.

Policy fragments, which comprise individual definitions, rules, specifications of permissions or restrictions, etc., can be combined to form policy elements. Policy elements typically define at least one area of policy, such as policy related to a particular application, to a class of devices, or to a particular datum, or class of data, but may comprise entire policies. A policy is comprised of one or more policy elements. Policies elements comprising a policy may be combined with policy elements comprising other policies to form new policies. A combination of policy elements may comprise the actions of adding the policy elements of the contributing policies together. In some cases, there may be conflicts between the policy elements of contributing policies that need to be resolved. Such resolution of policy conflicts is well understood in the art, and any of the known methods, such as selecting the most restrictive policy element for inclusion in the new policy when policy elements conflict, may be used.

In some embodiments, an enclave policy comprises one or more policies that apply to the enclave as a whole. Enclave policies comprise specifications that describe how enclave data is specified, identified, and controlled, the source of policy, how the policy is maintained, and any restrictions or requirements for LEI engines in support of an enclave. Enclave policy may specify that authentications be performed using any of a variety of known techniques, such as passwords, multi-factor authentication, challenge-response, etc. Enclave policy may be used to specify requirements for participation in an enclave (e.g., type of device, method of LEI implementation, data tagging capabilities, etc.), and for data exchange with non-participating and/or non-cooperative devices.

Enclave policy may further comprise default data specific policies for use when no data specific policy has been specified for a particular datum.

Enclave policy may make reference to enclaves, devices, applications, data communication paths, or data. References may be specific, e.g., "Enclave-X", "Device A", "Application-1", "Bluetooth", "File.name", or descriptive, e.g., "Enclaves supporting historical tracking of enclave association", "Devices of type smartphone", "Applications certificated by Company Alpha", "communications methods that move data in an encrypted state", "files in directory '/public'".

Exemplary implementations of enclave policy may specify at least the following:

(a) Identification of the data to be controlled.

(b) Specification for how data is to be segregated (stored and protected) on the device.

(c) Specifications identifying which apps or devices, are permitted to access enclave data, under what circumstances, and which operations are permitted (create, read, delete, modify, copy, etc., and only when not on-line, only to or from specific domains, etc.), (d) The form in which the policy is provided (e.g., syntax, encoding, policy elements vs. references to policy elements, etc.).

(e) The policy source and authentication module (or subsystem), which may be used for acquiring or accepting updates to the policy.

(f) Whether data within an enclave may be moved between LEIs of that enclave, and if so, is this some or all of the LEIs.

(g) Whether data within the enclave may be moved between enclaves, and if so, under what conditions (h) Restrictions on data transfer by enclave, device, transfer path, or application, as well as data transfer direction (e.g., send or receive).

(i) Restrictions on data operations (e.g., read, modify, create, delete, store, merge, or split), as well as how such are to be carried out (e.g., "connections are to be over VPN with Enclave-X", "Device A may not store data persistently", or "data merge is not permitted with data from other enclaves").

(j) Storage requirements for data that is not being transferred or processed, i.e., "data at rest", may be specified by enclave policy. Enclave policy may require that data be stored in an encrypted state, for example to limit disclosure if it is accessed by a system or device outside of those of the enclave system, or that Digital Rights Management (DRM) methods be used to control access to data. Enclave policy may also specify the operating system protections such as ACLs to be used on stored data.

(k) Enclave policy may specify limitations on the type of storage media that are usable (e.g., non-removable media only, removable media or non-removable media, local media only, local or networked media, access-controlled media only, or any media with the capability to specify the required protections). Enclave policy may specify storage requirements by media type. For example, enclave policy may specify that data is stored "in the clear" on non-removable media, but may be stored in an encrypted state on removable media.

(l) Requirements for a device or LEI to support a given enclave. For example, the device type, the specific device (e.g., Smart phone IMEI number, PDA serial number, etc.), devices with a specific Operating System (OS), devices with specific capabilities (e.g., encrypted file systems, network capability that may reach a policy source, data push reception, file system protection capabilities, etc.), devices in possession of a particular digital certificate, LEIs implemented using particular technologies, such as type 1 or type 2 hypervisors, or "wrapping" of applications, devices without removable media capabilities, etc.

Enclave policies may optionally specify additional attributes and features of data protection. Data specific policy may apply to specific data or data having specified characteristics. These comprise specifications that include, without limitation: (a) whether a history is maintained of prior enclaves with which the data has been associated; (b) access restrictions for the data by application, device, or enclave; (c) how data is tracked into, within, and out of applications; and (d) how data is to be stored when at rest and how it may be transferred between devices or enclaves.

In some cases, a data specific policy may be more restrictive in terms of permitted operations than the enclave policy. For example, if enclave policy specifies that transfer of data to Enclave-X is permitted, data specific policy for a datum may specify that transfer to Enclave-X is not permitted. On the other hand, if enclave policy specifies that data is to be maintained in an encrypted state while at rest, data specific policy for a given datum may not specify that data may be maintained in the clear while at rest.

Some cooperative devices may have device-specific policies specified that are imposed on all LEIs and applications instantiated on the device. Enclaves with these types of device policies that conflict with the device policies are not compatible with the device, and data belonging to the enclave may not be present on the device. Transfers of data from such enclaves to such devices are treated as transfers to a non-participating device.

In some embodiments, when transferring data between devices, such as within an enclave or between enclaves, data transfer may be controlled by enclave policy. Enclave policy may control whether the transfer is permitted at all, how the transfer is performed, and in some cases, how data tagging is handled.

Figure 3:
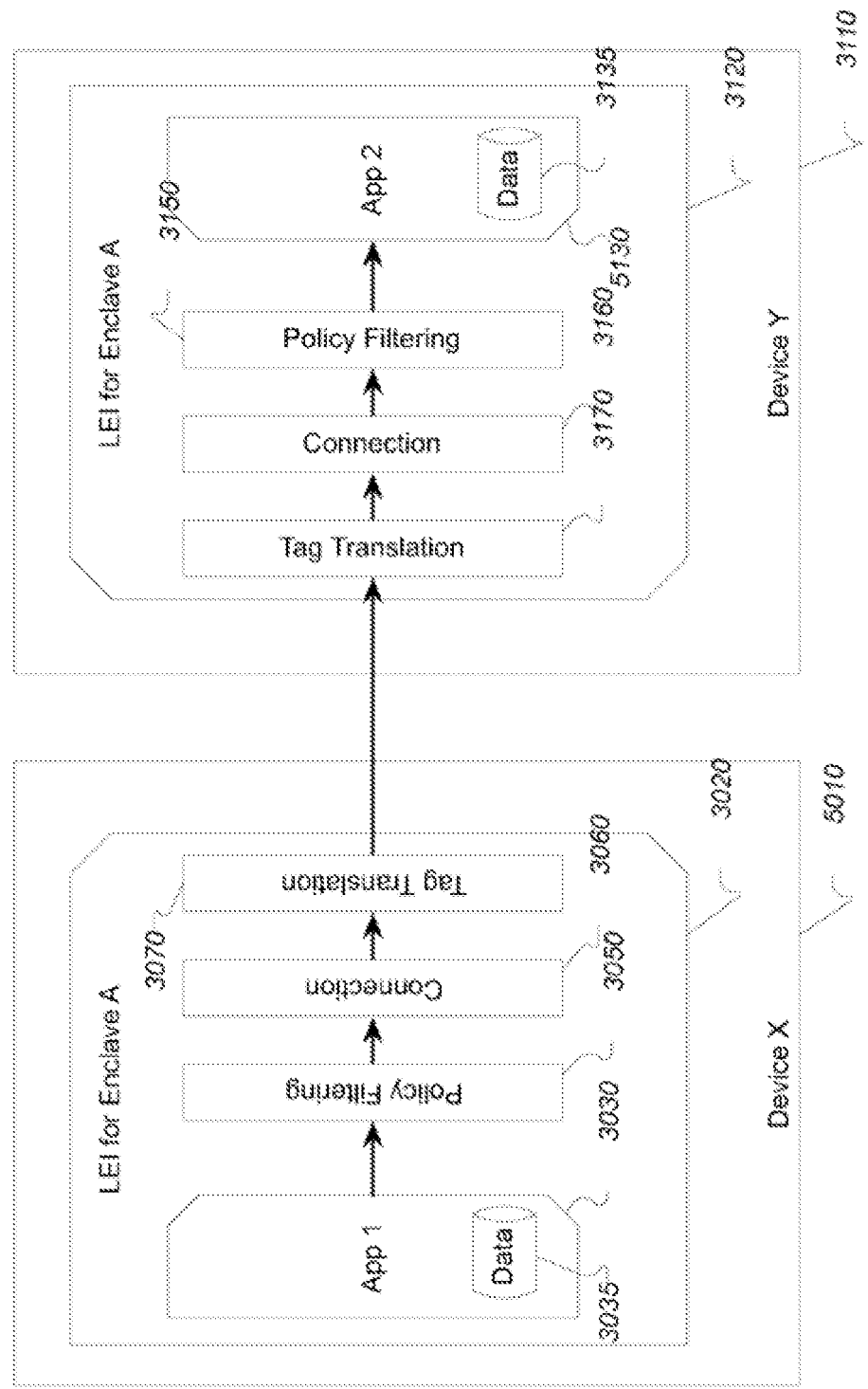
FIG. 3 illustrates a transfer of data between two LEIs that are present on differing devices but are members of the same Enclave, in accordance with an embodiment of the invention.

FIG. 3 schematically shows the transfer of data (3035), which is being processed by Application 1 (3030) on Device X (3010), with the data being in Enclave A (represented by the LEI for Enclave A (3020) on Device X (3010)) to Application 2 (3130) on Device Y (3110), which is also associated with Enclave A (represented by the LEI for Enclave A (3120) on Device Y (3110)) due to its processing of Enclave A data (3135).

When Application 1 (3030) attempts to send the Enclave A data (3035), the LEI interface on Device X (3020) first checks the enclave policy (3050) to ensure that a transfer of the data from Application 1 (3030) is permitted, that such a transfer may be made to a different device, and that the specific case of the destination being Device Y (3110) is permitted. Policy checks are necessary for each datum, though implementations to optimize the process, such as a one-time check that all data in a collection, such as a file, are covered by the same policies.

The connection check (3060) is then made to determine how enclave policy requires the connection between the devices (3010 & 3110) to be made. For example, whether a specific VPN may be used, whether the connection may be made using a wireless connection or not, whether the data may be encrypted while in transit, whether the data may be transferred with the devices in their current locations, etc. If the application has requested a connection that is not permitted by policy, the transfer may be blocked. In some cases, the system may alter the connection requested to comply with policy, with or without the application being alerted to this. For example, if an application requests a connection to a particular Internet address through a direct Wide Area Network (WAN) link, the LEI may, when policy requires it, instead make the connection through a proxy reached via a VPN.

When transferring between devices, the sending and receiving devices for the transfer may use different methods of identifying data, necessitating translation of the identification (for example, tagging) (3070 & 3170) as part of the transfer. The LEI interfaces of the involved devices negotiate whether translation of tagging is required, and if so, how translation is to be handled. For example, translation negotiation may be done using a method similar to that used by telnet clients and servers to negotiation options, where each device sends an "offer" of its capabilities, receives an "offer" of the capabilities of the other device, and sends an agreement or refusal of specific options. In other exemplary implementations, there may be a common identification format used for all device-to-device (or device to system) transfers, and the sending LEI translates or otherwise interprets data identification from its own format into the common format when the two differ, and the receiving LEI translates data identifications from the common format into its own format when the two differ. In some cases, data is transferred to the common format for transfer, and a receiving LEI modifies the received data to a data format that is specific to the receiving LEI. Alternatively, data is transferred using an LEI specific format, and maintained in an LEI using a common format. In some cases, data is transmitted under an LEI specific format and stored under a common format. In another implementation, identifications are performed by plug-in modules that may be incorporated into LEIs at installation time, instantiation time, or dynamically during run-time, as needed to support particular translation requirements.

On the receiving device (3110), data identifications are translated into the local format as required (3170), and a check is made that the data is arriving over an enclave policy-permitted connection (3160). Data is then filtered according to policy (3150) to permit only data that is sent from allowed enclaves, applications, devices and connections(?). Data that passes these checks is passed to Application 2 (3135).

Figure 4:
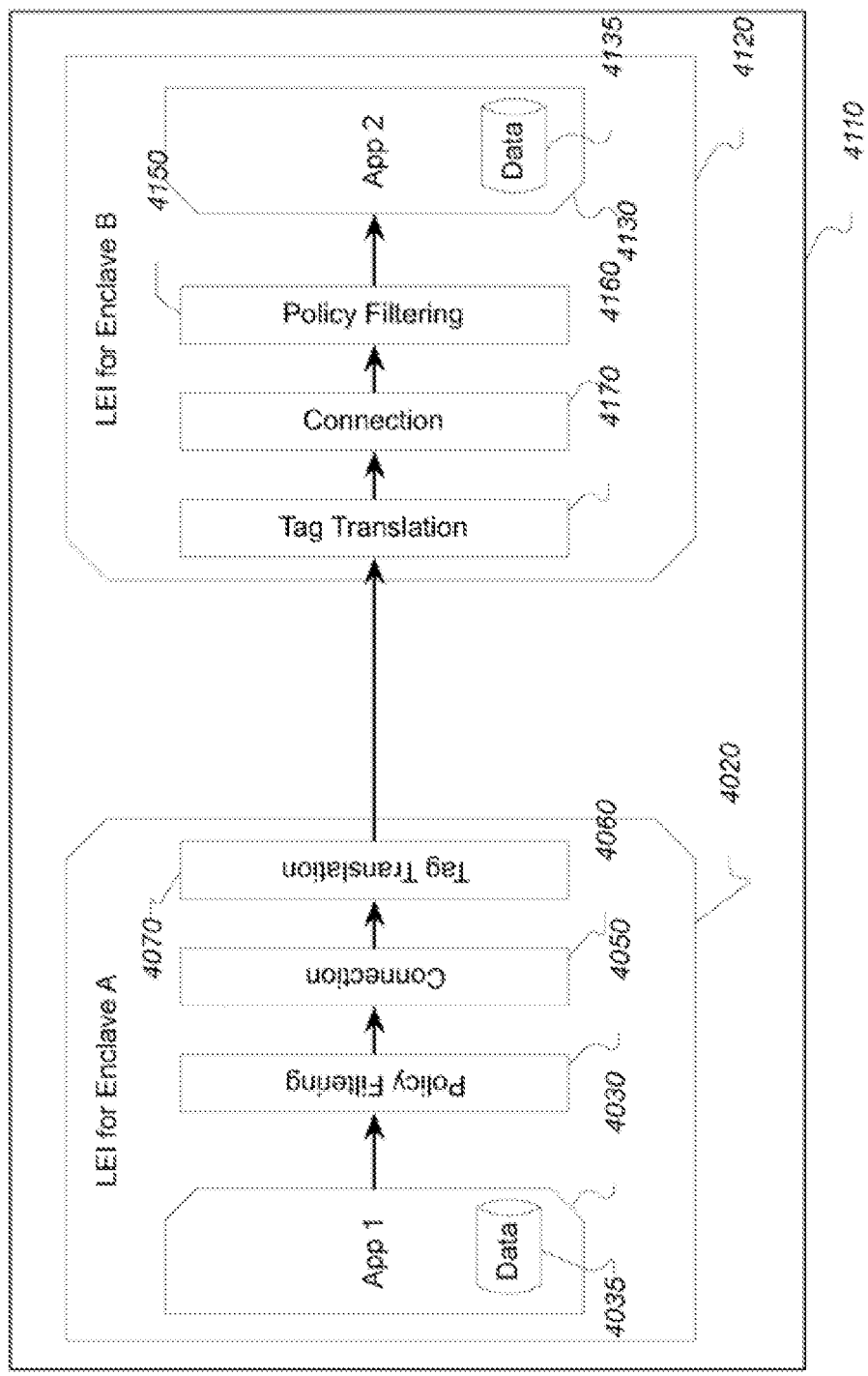
FIG. 4 illustrates a transfer of data between two LEIs that are present on the same device but are members of different Enclaves, in accordance with an embodiment of the invention.

In some embodiments, data can be transferred from one enclave to one or more other enclaves. FIG. 4 schematically shows the transfer of data (4035) owned by Enclave A, which is being processed by Application 1 (4030) (as represented by the LEI for Enclave A (4020)), to Application 2 (4130), which is in Enclave B (represented by the LEI for Enclave B (4120)). These two LEIs are present on the same device (4110). In some instances, the LEI for Enclave A and the LEI for Enclave B may be implemented by the same software, or even the same instantiation of that software, but using different policies for each enclave being supported. In other instances, the LEI for Enclave A and the LEI for Enclave B may be implemented using different software with different capabilities as well as the different policies for each enclave.

When Application 1 (4030) attempts to send the data (4035), the LEI interface for Enclave A (4020) first checks enclave policy (4050) to ensure that a transfer of the data from Application 1 (4030) is permitted, that such a transfer may be made to a different enclave, and that the specific case of the destination being Enclave B (4120) is permitted. Policy checks are necessary for each datum, though implementations to optimize the process, such as a one-time check that all data in a collection, such as a file, are covered by the same policies, may be used.

The connection check (4060) determines how policy requires the transfer between the enclaves (4020 & 4120) to be made. For example, whether the transfer may be made using a clipboard capability of the device, whether a shared memory capability is permitted, whether the data is simply by the receiving LEI, etc.

When transferring data between enclaves, especially when this involves different LEIs, the source and destination enclaves may use different methods of tagging data, necessitating translation of tagging (4070 & 4170) as part of the transfer. The LEIs interface may negotiate whether translation of identification is required, and if so, how translation is to be handled as described above for device-to-device data transfers. When transfer is between enclaves supported by the same LEI on a single device, tagging translation is not typically required unless the policies of the two enclaves involved in the transfer require specific and incompatible identification methods (e.g., one may require history be maintained, while the other does not permit this). In the receiving LEI (4120), data identification are translated into the local format as required (4170), and a check is made that the data is arriving by a permitted method (4160). Data is then filtered according to policy (4150) to permit only data that is sent from allowed enclaves and applications. Data that passes these checks is passed to Application 2 (4135). If compatible tagging schemes are used between LEI's on the same device, and the two enclave policies permit it, the data may be retagged and not actually moved. Alternatively, additional tags may be added to the data in-situ.

In some embodiments, data is transferred between or within enclaves in a manner that permits data identification to be maintained, and for the enclave having data or associated with the data to be determined from the data unless otherwise specified by the policies of the enclave (e.g., when a policy permits data transfer out of an enclave to a non-participating device, such transfers may cause loss of identification and the enclave history of the datum may be lost). Such determination may aid in routing data to a source or destination enclave.

In some embodiments, data is transmitted from a source enclave or device to a destination enclave or device. For instance, data is transmitted from a source enclave to a destination enclave on the same device, or from a source device to a destination device in the same enclave. Prior to data transfer, a tag associated with the data is removed, and upon receipt of the data at a destination enclave or device, a tag may be reapplied to the data. The source and destination devices or enclaves may be the same device or enclave, respectively. In some cases, the tag may permit data and/or file identification.

Data being transferred to a non-cooperative device from an enclave may be transferred with a tag removed. Such is typically done when the method of tagging used may cause interference with use of the data by applications on the non-cooperative device. Where tagging may not cause such interference, a tag may be retained on data transferred to a non-cooperative device from an enclave. Such a tag may be useful if the data is later transferred from the non-cooperative device into an enclave. Identification history may, in some implementations, be similarly treated.

Data transfer may be implemented with the aid of systems provided herein, such as the system 700 of FIG. 7 having the server 701 and associated software to implement data transfer.

In some cases, data that lacks identification, and that is being transferred from a non-cooperative device into an enclave on a cooperative device (e.g., when an application that has previously read data from a given enclave reads additional untagged data, and the LEI design is such that the untagged data is tagged for the given enclave previously read from by the application), may be tagged with an identification tag associated with a specific enclave, while in other exemplary implementations, the identification of such data is specified by LEI design and may vary with aspects of the data, or the transfer, such as the sending device identity or type, the data type, the type of connection used for the transfer, or by other aspects. When data with tagging is being transferred from a non-cooperative device into an enclave, the enclave policy determines how tagging of the data is handled (e.g., tags are retained "as-is", tags are replaced or removed, tags are retained for historical tracking, but data is retagged, etc.).

Methods for Creating One or More Local Enclave Instances

Another aspect of the invention provides methods for creating a local enclave instance (LEI). An LEI can be created on devices disclosed herein. The creating of an LEI on a device permits the device to access data in the enclave. Such access may permit a user to read the data and edit the data, based on usage restrictions as provided in the one or more policies of the enclave.

Figure 5:
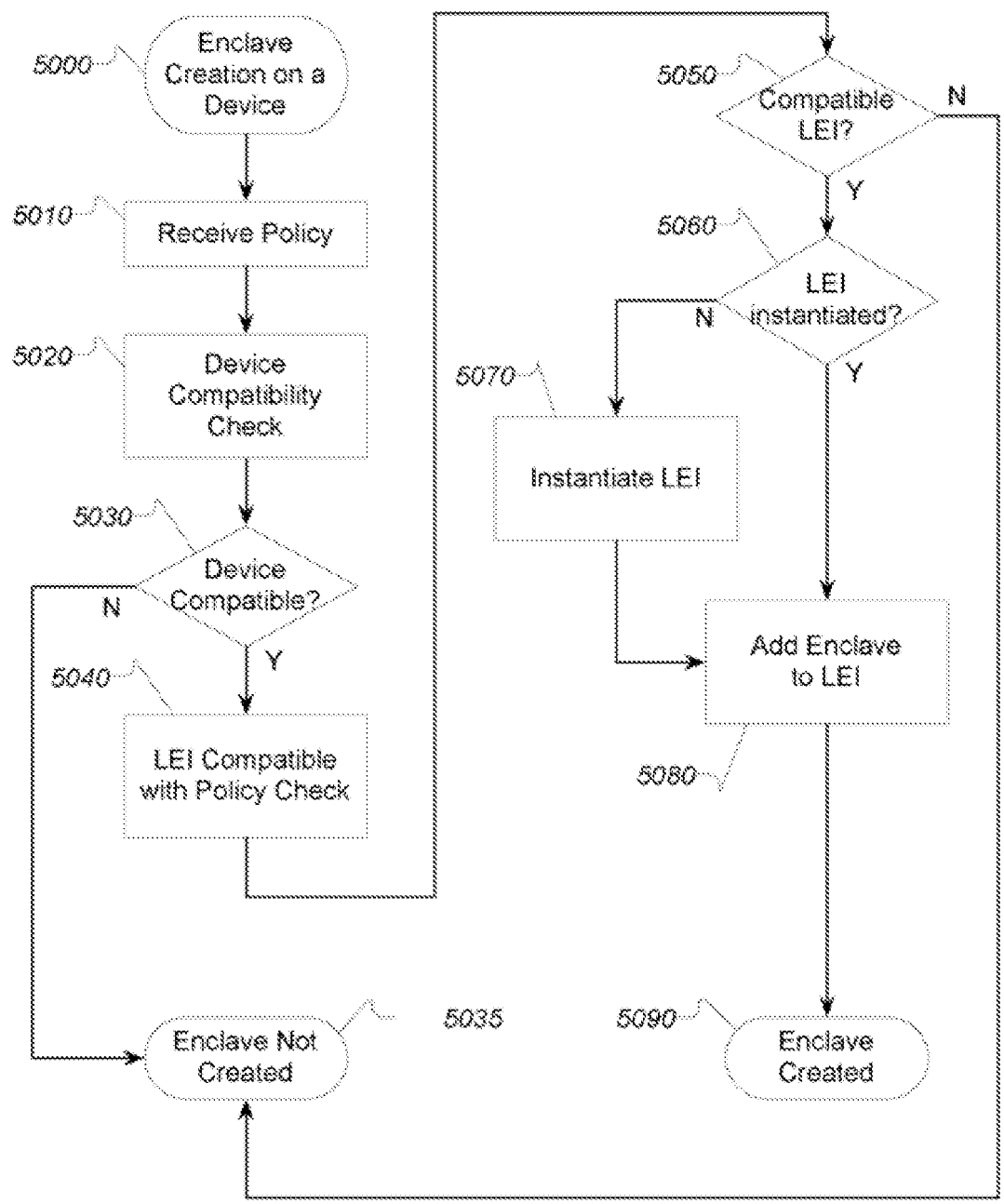
FIG. 5 depicts an example process flow for creation of a LEI on a device, in accordance with an embodiment of the invention.

FIG. 5 schematically illustrates a method for creating an LEI on a cooperative device. The cooperative device may become a participating device for a specific enclave by following a process by which a policy for the enclave is obtained from one or more policy sources by the local controller (step 5010). These policies may include enclave policy(ies), data policy(ies), and/or device policy(ies). The local controller then checks the policies to ensure that the device is compatible with the policy(ies) (step 5020) by comparing the cooperative device information and capabilities against those specified by the policy(ies) (step 5030). If the comparison indicates that the device is not compatible with the policy(ies), the "N" branch shown from the decision is taken and the process terminates without an LEI being created and made a member of the enclave. If the device is determined to be compatible with the policy(ies), the local controller then checks to determine if an LEI of a specified type is available on the device (step 5040). If no policy compatible LEI is available on the device, the "N" branch of decision step 5050 is taken and the process terminates without an LEI being created and made a member of the enclave. The local controller then checks to determine if the LEI requires a separate instance, or if the enclave may be added to an existing LEI (step 5060). If the LEI is not current instantiated, the local controller instantiates an LEI of the policy specified type (step 5070). The enclave information and policy is then added the now instantiated LEI (step 5080) and the LEI then manages and controls the data of the newly added enclave.

When a device is made cooperative, such as by instantiation of a LEI (as described above), there may be existing data on the device that is not tagged as belonging to any enclave. In some cases it may be desirable to place such data into an enclave. For example, when a user begins using a personally owned device for work purposes, there is likely to be personal data on the device. Establishment of a "work" enclave for enterprise data, and of a "personal" enclave for personal data enables separation of each type of data, and control of the data by the respective entities, but untagged data pre-existing on the device when these enclaves are created is in neither enclave and therefore uncontrolled by any enclave policy. In some exemplary implementations, pre-existing data may be automatically tagged and placed into a default enclave with a default policy. For example, the default action in some implementations may be to associate pre-existing data with a specific enclave on the device (e.g., the first enclave created on a device). In some other implementations, the default action may be to create a special enclave with a very permissible policy (i.e., that places no restrictions beyond the OS imposed restrictions already existing for each datum on data in the special enclave) and place all pre-existing data into this enclave. In yet other implementations, a user is prompted to associate pre-existing data to a specific enclave. In still other exemplary implementations, automated heuristics may be used to determine whether and how to associate pre-existing data. Alternatively, pre-existing data may remain unassociated with any enclave.

Inter-LEI Communication

Figure 6:
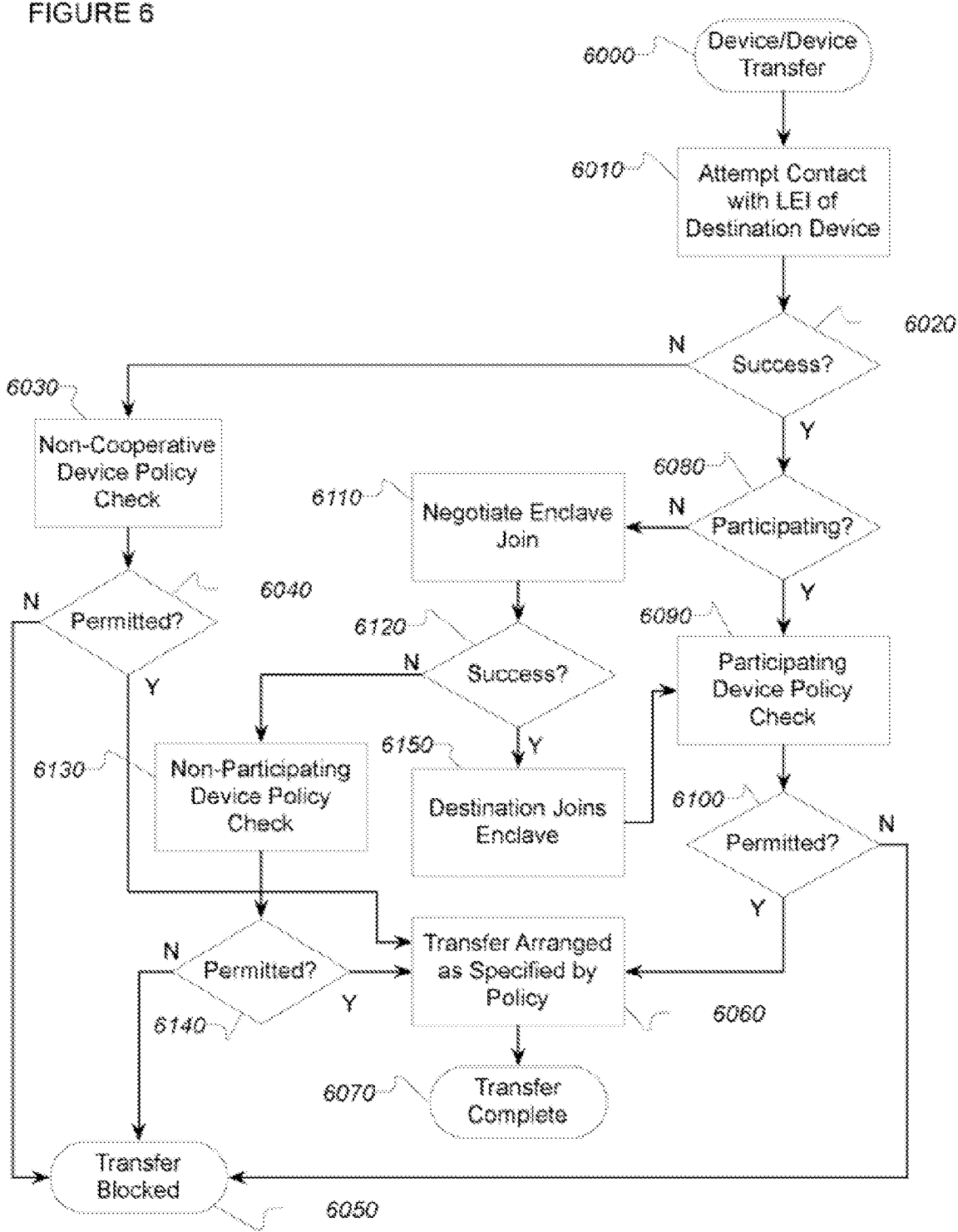
FIG. 6 depicts an example process flow for establishing inter-LEI communications, in accordance with an embodiment of the invention.

Another aspect of the invention provides inter local enclave instance communication. With reference to FIG. 6, in an embodiment, a flowchart is provided showing an exemplary procedure for use when attempting to transfer data in an enclave to another device (6000). A first step is for the LEI interface of the sending cooperative device attempts to contact a LEI interface of the receiving cooperative device (6010). If the attempt is not successful (6020), the receiving device is treated as a non-cooperative device, and the policy of the enclave of the data determines whether and how the transfer is to proceed (6030). If the policy does not permit the transfer (6040), the LEI interface blocks the transfer and the process is complete (6050). In some implementations, the requesting application, thread, or process may receive an error status return, an error message in a message queue, or other indication of failure as specified by the design of the device and software involved. If the policy permits transfer to a non-cooperative device (6040), the LEI interface arranges the transfer as required by the policy and permits it to proceed in that manner (6060) until the transfer is complete (6070). Arranging transfer as required by policy may comprise such things as opening a connection via a specified VPN, encrypting or decrypting data, removing or altering data tagging, recording the transfer in an audit log, etc.

If the attempt to contact the LEI of the receiving device succeeds (6020), the sending LEI and the receiving LEI negotiate to determine whether the receiving LEI is participating or not participating in the enclave of the data to be transferred. If the receiving LEI is participating in the data's enclave (6080), a check of policy to see if the transfer of the data to that particular device within the enclave is permitted (6090).

If the transfer is not permitted (6100), the transfer is blocked and the process is complete (6050). As described above, the requesting application, threat, process, etc. may be notified of the failure in various ways determined by the design of the device and its software. If the transfer is permitted (6100), the LEI arranges the transfer as required by the policy and permits it to proceed in that manner (6060) until the transfer is complete (6070). Arranging transfer as required by the policy is described above.

If the receiving LEI is not participating in the data's enclave (6080), the sending and receiving LEIs negotiate to determine whether the receiving LEI is eligible to participate in the enclave, and whether the receiving LEI is willing to participate in the enclave (6110). Device type, device policy, resource availability, LEI capabilities and implementation method, etc. may prevent a given LEI from supporting a given enclave. In some implementations, it may be possible for a receiving LEI to instantiate a second LEI on the same device that is capable of supporting a given enclave, in which case the second LEI assumes the role of receiving LEI and the process continues. If the receiving LEI is eligible and willing to support the enclave, negotiation is successful (6120), the sending enclave transfers the enclave policy to the receiving LEI, the receiving LEI becomes a participating LEI in the enclave (6150), and the transfer process proceeds as described for a participating LEI (6090). If the negotiation is not successful (6120), the receiving LEI remains a non-participating LEI, and a check of policy is made to determine whether the transfer is permitted (6130). If it is not permitted (6140), the transfer is blocked and the process is complete (6050). As described above, the requesting application, threat, process, etc. may be notified of the failure in various ways determined by the design of the device and its software. If the transfer is permitted (6140), the sending LEI arranges the transfer as required by the enclave policy and permits it to proceed in that manner (6060) until the transfer is complete (6070). Arranging transfer as required by the policy is described above.

EXAMPLES

Provided below are various examples that illustrates various features of systems and methods of the present disclosure. The methods can be implemented upon the execution of machine-executable code by a computer processor of a computer system, such as, for example, the server 701 of FIG. 7.

Example 1

An example of the use of systems and methods provided herein is to protect information taken from an enterprise application (e.g., a defined device in the network "cloud") and to persistently protect that information while is it used on the device. The participating device has implemented an LEI in accordance with a policy for an enclave that includes the enterprise application and the user's device (e.g., Apple® iPhone®, Android® enabled device). This use case demonstrates the use of the exemplary technology to limit the case where a user downloads a file from an enterprise server, saves it to their local media, and then uploads it to an unprotected location.

First, the user launches Box® and navigates to a sensitive enterprise document (e.g., diligence related to a pending M&A deal). Source data is unlabeled, as it is coming from a non-participating system. To determine whether and how to label data as it arrives on the device, LEI on device matches supported enclave policies and determines that unlabeled data from the enterprise source is to be labeled for the "Enterprise" enclave. Data is associated with the enterprise enclave as it arrives via the enclave interface and is read by the Box application.

Then the user taps "Save For Offline." The system intercepts the write attempt and identifies that the data being saved has been previously labeled as part of the "Enterprise" enclave. The system checks the policy for the Enterprise enclave, and determines that it is permitted to store documents to removable media as long as the labeling is persisted. The document is saved to the device's secure digital (SD) card (or other memory location) and the data is labeled as part of the enterprise enclave.

Then, the user launches Evernote® and creates a new note. The user then attaches the sensitive document to an Evernote note. The action of attaching the box file to the Evernote note requires the communication of the data from the SD card to the Evernote application. The Enterprise enclave policy is checked, and it is found that Evernote is permitted to read Enterprise enclave data, so the attachment proceeds. Had the Enterprise enclave policy not permitted Evernote to read Enterprise data, the attempt to attach the Box file to the Evernote note may have failed.

Evernote requests sync of the note to the cloud in user's personal repository. Evernote's request to move data to the cloud is a device-to-device transfer, as well as a transfer from an enclave to a non-cooperative device, since Evernote's cloud is non-cooperative. The enterprise enclave policy is checked and found to prohibit transfer to non-participating devices unless the device is the enterprise data source. The attempt to sync to the Evernote cloud fails. Alternatively, the Enterprise policy could permit the sync of data from Evernote, but require that the data be encrypted and therefore only accessible when it was moved back to the device.

The system can protect against the retrieval of the sensitive enterprise document by 1) preventing the file from being downloaded to the device of the user, or 2) allow the user to download the file to the device of the user but encrypt the file subsequent to the file being saved on the device of the user. Then, should the user wish to sync an Evernote note with the file to the cloud, the file would be encrypted and the data would be protected.

Example 2

In another example, the transfer of data from a first application to a second application is subject to restrictions. In this case, the device is configured in the same way as for Example 1.

First, the user launches the Box® application and navigates to a document in the Enterprise enclave on the device. This can be, for example, the document discussed in Example 1.

Then, the user taps Open and the LEI checks enclave policy to determine whether Box is permitted to read the data. If it is, the read request is permitted to proceed and the document is opened in a default document viewer.

In the document viewer, the user taps Menu→File→Send and selects Evernote—Create Note (as the receiving app). The send request is transmitted by the application to the communications component and is intercepted by the LEI interface. The LEI checks Enterprise enclave policy to see if sending data to the Evernote app is permitted. In this case, the Enterprise enclave policy does not allow sending data to Evernote, so the send is blocked, and no new Evernote note is created. Data export to Evernote is thus prevented. The user gets a failure notice from the Box app on the device of the user.

Example 3

In another example, a device of a user is set up in a manner similar to that used in Example 1 and Example 2.

First, the user launches a work related contacts application and requests to open a corporate contact (e.g., co-worker's contact record) that is located in the enterprise enclave. This information may have been previously downloaded from an enterprise server, or may have been entered by the user and manually associated with the enterprise enclave. The LEI for the enterprise enclave checks the enclave policy and determines that the work-related contacts application is permitted to read the corporate contact data. The data is read by the application and displayed to the user.

The user now wishes to send the corporate contact data to another device. In the document viewer, the user taps Menu→File→Send and selects Bluetooth. The LEI interface intercepts the communications request. The LEI interface checks the enclave policy to see if data from that enclave may be sent via Bluetooth to another device. In this example, the enclave policy prohibits sending data via Bluetooth, so the send request is blocked. The user receives a failure notification for the send, and is not permitted to send the corporate contact data to another device via Bluetooth.

The LEI interface can prevent protected files from being directed to another device via an unpermitted communication interface by 1) preventing a send request through Bluetooth, or as an alternative, 2) disabling Bluetooth while the user is accessing data from a protected app, thus preventing sharing the file via Bluetooth.

Example 4

In another example, a device of a user is set up in a manner similar to that used in Example 1 and Example 2.

User/employee launches an e-mail client used for work and opens an e-mail message containing sensitive data in the body of the message (e.g., hospital patient data). The LEI checks the attributes of the source of the data and finds that it is non-cooperative, so the e-mail message is tagged using a default enclave as per the design of the LEI, and access of the e-mail message (e.g., for reading purposes) is permitted. The default enclave is not restricted as to how its data may be used.

User then taps "Select All" and then "Copy" to copy text to system clipboard. Since the data is tagged with a default enclave that permits any operation, the LEI does not block the copy to the system clipboard.

User then launches Evernote, creates a new note, and pastes the previously copied text from the system clipboard into the Evernote note. Since the data is tagged with the permissive enclave, the LEI does not block the copy to the system clipboard.

Next, the Evernote note with the sensitive data is synced to the cloud in the user's personal repository on Evernote. Since the data is tagged with the permissive enclave, the LEI does not block the sync to the user's personal repository.

In cases in which transfer of a protected file to another location is not permitted, the LEI can prevent the operation. For example, if the "Select All" and "Copy" operations are not permitted, the LEI can prevent the operations.

Example 5

Figure 9:
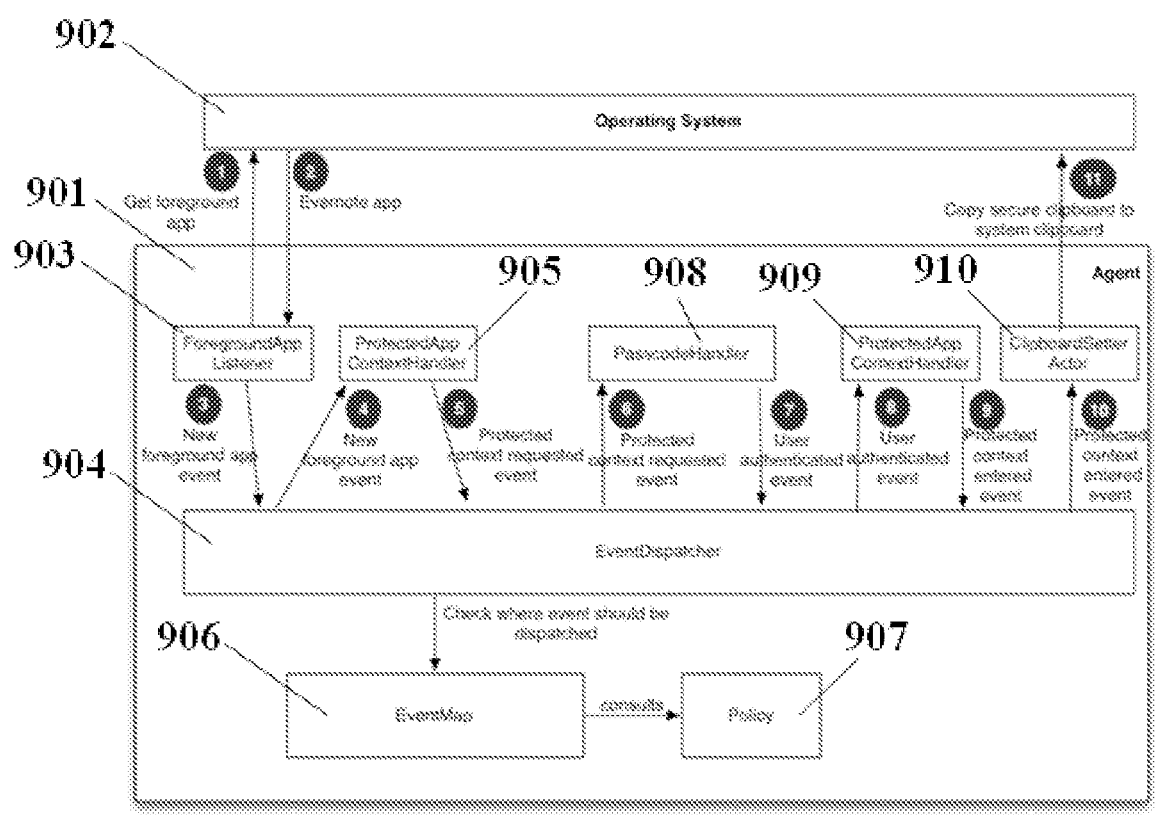
FIG. 9 shows a workflow in which data is transferred from a secure memory location (e.g., clipboard) to a system clipboard and subsequently to another application.

This example illustrates a clipboard protection scenario. FIG. 9 shows a workflow in which data is transferred from a secure memory location (e.g., clipboard) to a system clipboard and subsequently to another app. The workflow of FIG. 9 can be implemented by a system 900 comprising an agent 901 and an operating system 902. The agent 901 comprises a foreground app listener 903, an event dispatcher 904, a protected app context handler 905, an event map 906, a policy 907, a passcode handler 908, another protected app context handler 909 and a clipboard settler actor 910. The system 900 can be similar to the system 800 of FIG. 8.

The agent 901 can be implemented with the aid of an app residing on the operating system 902. The system 900 can include other apps, such as, for example, Evernote®. In the illustrated example, a user wishes to copy data from a secure memory location to a system clipboard and subsequently to an Evernote note.

In a first operation, the foreground app listener 903 detects a new foreground app event in the operating system 902. In the illustrated example, the new foreground app event detected by the foreground app listener 903 is the request of a user to copy and paste data from a protected system clipboard to an Evernote note, which can involve initially copying the data to the system clipboard. The foreground app listener 903 notifies the event dispatcher 904 of the new foreground app event. The event dispatcher 904 requests from the event map 906 an indication as to which handler the event should be dispatched to. The event map 906, upon consulting the policy 907, notifies the event dispatcher 904 that the event should be dispatched to the protected app context handler 905.

The new foreground app event is then dispatched to the protected app context handler 905, which provides a protected context requested event to the event dispatcher 904. The event dispatcher 904 recognizes that the protected context request event indicates that a passcode is required. The event dispatcher 904 then directs the protected context request event to the passcode handler to authenticate the user using a passcode of the user. If the user is successfully authenticated by the system (i.e., the correct passcode is provided by the user), then the passcode handler 908 directs a user authenticated event to the event dispatcher 904. The event dispatcher 904 then directs the user authenticated event to another protected app context handler 909, which then provides the event dispatcher 904 a protected context entered event. The protected context entered event is then routed by the event dispatcher 904 to the clipboard settler actor 910. The agent then permits the data to be copied from secure memory location to the system clipboard, and subsequently to the Evernote note.

Example 6

Figure 10:
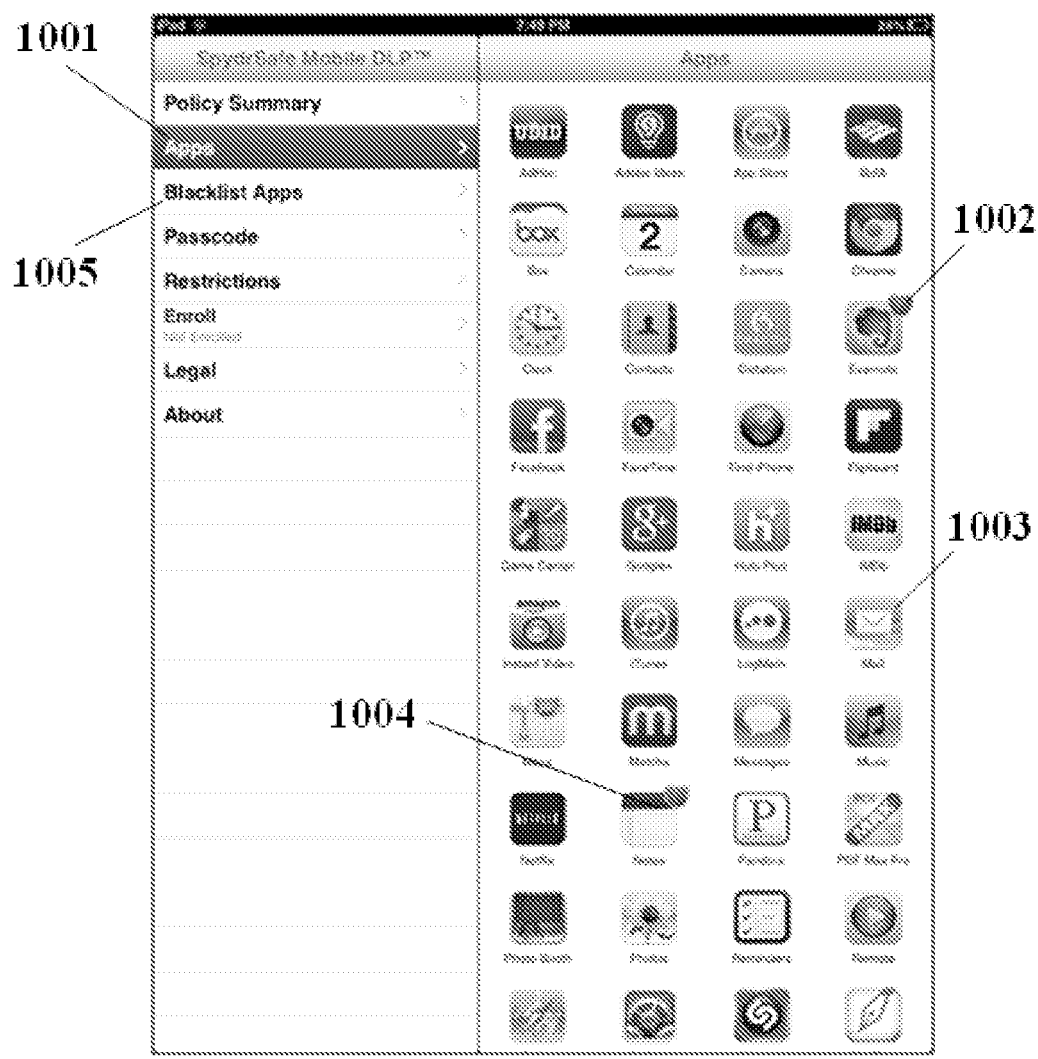
FIG. 10 is a screenshot of a graphical user interface (GUI) of an application installed on an electronic device of a user that is programmed to implement and manage LEI's.

FIG. 10 is a screenshot of a graphical user interface (GUI) 1000 of an application installed on an electronic device of a user that is programmed to implement and manage LEI's. The application includes an Apps menu item 1001 that enables the user to select applications that the user wishes to include in an LEI on the electronic device. The Evernote® application 1002 has been selected to be included in an LEI, but the Mail application 1003 is not included in an LEI. In the GUI 1000, the Evernote application 1002 is shown with a shield graphic at an upper right-hand corner of an icon of the application. The Notes application 1004 also has a shield graphic and is therefore included in an LEI. The Mail application 1003 does not have the shield icon because this application is not included in an LEI. If the user wishes to launch the Evernote application 1002 or Notes application 1004, the system will request that the user enter a pass code.

The application of FIG. 10 permits various features and functionalities. A Blacklist Apps menu item 1005 permits the user to select applications that the user wises to prevent from launching. An application that has been blacklisted will not be permitted to run, with or without a pass code.

The application of FIG. 10 can permit the user to select whether the copy and paste operating system functionality is to be regulated by the application. If selected, then the system can regulate copying and pasting as described above.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of embodiments of the invention herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for operating a device to manage and control data, comprising:
   (a) identifying controlled data using a first local enclave instance (LEI) on a first electronic device, wherein said first LEI is a member of a first enclave, and wherein said first enclave has a first policy regulating usage and/or access rights to said controlled data throughout said first enclave;
   (b) receiving a request to transfer said controlled data from said first LEI to a destination residing in (i) an application external to said first LEI and on said first electronic device, (ii) a second LEI, or (iii) a second electronic device;
   responsive to the destination residing in the application external to said first LEI and on said first electronic device:
      determining, with aid of a processor, one or more application attributes of said destination, wherein said one or more attributes includes an identifier of the application; and
      permitting or denying the request of (b) based upon a processor-assisted comparison of said one or more application attributes against one or more attributes for permitting data transfer provided in said first policy;
   responsive to the destination residing in the second LEI:
      determining, with the aid of a processor, one or more enclave attributes of said destination, wherein said one or more attributes includes an identifier of an enclave of which the second LEI is a member; and
      permitting or denying the request of (b) based upon a processor-assisted comparison of said one or more enclave attributes against one or more attributes for permitting data transfer provided in said first policy; and
   responsive to the destination residing in the second electronic device:
      determining, with the aid of a processor, one or more device attributes of said destination, wherein said one or more attributes includes an identifier of the second electronic device; and
      permitting or denying the request of (b) based upon a processor-assisted comparison of said one or more device attributes against one or more attributes for permitting data transfer provided in said first policy.

2. The method of claim 1, wherein said second LEI is on said second electronic device.

3. The method of claim 1, wherein said second LEI is a member of a second enclave, and wherein said second enclave has a second policy for regulating usage and/or access rights throughout said second enclave that is different from said first policy.

4. The method of claim 1, wherein (b) comprises receiving a request to transfer said controlled data from said first LEI to a destination residing in an application external to said first LEI and on said first electronic device.

5. The method of claim 1, wherein said one or more application attributes, enclave attributes, or device attributes do not comply with said one or more attributes for permitting data transfer provided in said first policy, and wherein said request is denied.

6. The method of claim 1, wherein said one or more application attributes, enclave attributes, or device attributes comply with said one or more attributes for permitting data transfer provided in said first policy, and wherein said request is permitted.

7. The method of claim 1, wherein said request received in (b) is a trigger event associated with an application on said first electronic device.

8. The method of claim 1, wherein said controlled data is in a non-transitory, tangible computer readable storage medium.

9. A method for enabling a user to manage and control data, comprising:
   (a) identifying controlled data using a first local enclave instance (LEI) on a first electronic device, wherein said first LEI is a member of a first enclave, and wherein said first enclave has a first policy regulating usage and/or access rights to said controlled data throughout said first enclave;
   (b) identifying, with the aid of a processor, a destination location residing in (i) an application external to said first LEI and on said first electronic device, (ii) a second LEI, and/or (iii) a second electronic device;
   responsive to the destination location residing in the application external to said first LEI and on said first electronic device:
      determining one or more application attributes of said destination location, wherein said one or more application attributes includes an identifier of the application;
      performing, with aid of a processor, a comparison of said one or more application attributes against one or more attributes for permitting data transfer provided in the first policy; and
      permitting transfer of said controlled data to said destination location based upon the comparison;
   responsive to the destination residing in the second LEI:
      determining one or more enclave attributes of said destination location, wherein said one or more enclave attributes includes an identifier of an enclave of which the second LEI is a member;
      performing, with aid of a processor, a comparison of said one or more enclave attributes against one or more attributes for permitting data transfer provided in the first policy; and
      permitting transfer of said controlled data to said destination location based upon the comparison; and responsive to the destination residing in the second electronic device:
  determining one or more device attributes of said destination location, wherein said one or more device attributes includes an identifier of the second electronic device;
  performing, with aid of a processor, a comparison of said one or more device attributes against one or more attributes for permitting data transfer provided in the first policy; and
  permitting transfer of said controlled data to said destination location based upon the comparison.

10. The method of claim 9, wherein said second LEI is on said second electronic device.

11. The method of claim 9, wherein said second LEI is a member of a second enclave, and wherein said second enclave has a second policy for regulating usage and/or access rights throughout said second enclave that is different from said first policy.

12. The method of claim 9, wherein (b) comprises identifying, with the aid of a processor, a destination location residing in an application external to said first LEI and on said first electronic device.

13. The method of claim 9, further comprising, prior to (b), receiving a request to transfer said controlled data from said first LEI to a destination location residing in an application external to said first LEI and on said first electronic device.

14. The method of claim 9, wherein said controlled data is in a non-transitory, tangible computer readable storage medium.

15. A non-transitory computer-readable storage medium comprising machine-executable instructions for operating a device to manage and control data, the instructions comprising:
  (a) instructions for identifying controlled data using a first local enclave instance (LEI) on a first electronic device, wherein said first LEI is a member of a first enclave, and wherein said first enclave has a first policy regulating usage and/or access rights to said controlled data throughout said first enclave;
  (b) instructions for receiving a request to transfer said controlled data from said first LEI to a destination residing in (i) an application external to said first LEI and on said first electronic device, (ii) a second LEI, or (iii) a second electronic device;
  instructions for, responsive to the destination residing in the application external to said first LEI and on said first electronic device:
    determining, with aid of a processor, one or more application attributes of said destination, wherein said one or more attributes includes an identifier of the application; and
    permitting or denying the request of (b) based upon a processor-assisted comparison of said one or more application attributes against one or more attributes for permitting data transfer provided in said first policy;
  instructions for, responsive to the destination residing in the second LEI:
    determining, with the aid of a processor, one or more enclave attributes of said destination, wherein said one or more attributes includes an identifier of an enclave of which the second LEI is a member; and
    permitting or denying the request of (b) based upon a processor-assisted comparison of said one or more enclave attributes against one or more attributes for permitting data transfer provided in said first policy; and
  instructions for, responsive to the destination residing in the second electronic device:
    determining, with the aid of a processor, one or more device attributes of said destination, wherein said one or more attributes includes an identifier of the second electronic device; and
    permitting or denying the request of (b) based upon a processor-assisted comparison of said one or more device attributes against one or more attributes for permitting data transfer provided in said first policy.

16. The non-transitory computer-readable storage medium of claim 15, wherein said second LEI is on said second electronic device.

17. The non-transitory computer-readable storage medium of claim 15, wherein said second LEI is a member of a second enclave, and wherein said second enclave has a second policy for regulating usage and/or access rights throughout said second enclave that is different from said first policy.

18. The non-transitory computer-readable storage medium of claim 15, wherein (b) comprises receiving a request to transfer said controlled data from said first LEI to a destination residing in an application external to said first LEI and on said first electronic device.

19. The non-transitory computer-readable storage medium of claim 15, wherein said one or more application attributes, enclave attributes, or device attributes do not comply with said one or more attributes for permitting data transfer provided in said first policy, and wherein said request is denied.

20. The non-transitory computer-readable storage medium of claim 15, wherein said request received in (b) is a trigger event associated with an application on said first electronic device.

* * * * *